United States Patent
Jung et al.

(10) Patent No.: US 11,206,558 B2
(45) Date of Patent: Dec. 21, 2021

(54) METHOD AND APPARATUS FOR PERFORMING RADIO LINK MONITORING TO SUPPORT V2X COMMUNICATION IN NEXT-GENERATION MOBILE COMMUNICATION SYSTEM

(71) Applicant: Samsung Electronics Co., Ltd., Suwon-si (KR)

(72) Inventors: Sangyeob Jung, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 16/743,588

(22) Filed: Jan. 15, 2020

(65) Prior Publication Data

US 2020/0229007 A1    Jul. 16, 2020

(30) Foreign Application Priority Data

Jan. 16, 2019    (KR) .................. 10-2019-0005740

(51) Int. Cl.
*H04W 24/04* (2009.01)
*H04W 72/04* (2009.01)
*H04W 76/10* (2018.01)

(52) U.S. Cl.
CPC .......... *H04W 24/04* (2013.01); *H04W 72/04* (2013.01); *H04W 76/10* (2018.02)

(58) Field of Classification Search
CPC ..... H04W 72/04; H04W 24/04; H04W 76/10; H04W 76/30; H04W 76/27; H04W 88/04;
(Continued)

(56) References Cited

U.S. PATENT DOCUMENTS 5,084,816 A *  1/1992  Boese .................. B82Y 15/00
370/225
2013/0324114 A1    12/2013  Raghothaman et al.
(Continued)

FOREIGN PATENT DOCUMENTS

KR    10-2019-0036251 A    4/2019
WO    2013-181421 A2    12/2013
(Continued)

OTHER PUBLICATIONS

International Search Report dated May 4, 2020, issued in an International Application No. PCT/KR2020/000742.
(Continued)

*Primary Examiner* — Brian D Nguyen
(74) *Attorney, Agent, or Firm* — Jefferson IP Law, LLP

(57) ABSTRACT

A communication method for convergence of a 5G communication system for supporting a higher data transmission rate beyond a 4G system with an IoT technology, and a system therefor is provided. The disclosure may be applied to an intelligent service (for example, smart home, smart building, smart city, smart car or connected car, health care, digital education, retail business, security and safety-related service, and the like), based on a 5G communication technology and an IoT-related technology. The method includes performing radio link monitoring to support V2X communication in a next-generation mobile communication system.

18 Claims, 11 Drawing Sheets

(58) Field of Classification Search
CPC ... H04W 84/047; H04W 76/38; H04W 76/23; H04W 76/14
See application file for complete search history.

(56) References Cited

U.S. PATENT DOCUMENTS

| | | |
|---|---|---|
| 2016/0044737 A1 | 2/2016 | Kwon |
| 2017/0019881 A1 | 1/2017 | Cao et al. |
| 2017/0041902 A1* | 2/2017 | Sheng .................... H04W 72/02 |
| 2017/0150490 A1* | 5/2017 | Chen .................... H04W 76/27 |
| 2019/0191442 A1* | 6/2019 | Lu ........................ H04W 72/087 |
| 2020/0029384 A1* | 1/2020 | Hong .................... H04W 36/34 |
| 2020/0100088 A1* | 3/2020 | Kim ....................... H04W 88/04 |
| 2020/0367312 A1* | 11/2020 | Shi ........................ H04W 24/00 |
| 2021/0029761 A1* | 1/2021 | Jung ....................... H04W 4/40 |

FOREIGN PATENT DOCUMENTS

| | | |
|---|---|---|
| WO | 2016-021960 A1 | 2/2016 |
| WO | 2016-122114 A1 | 8/2016 |

OTHER PUBLICATIONS

3GPP; TSG RAN; Evolved Universal Terrestrial Radio Access (E-UTRA) and Evolved Packet Core (EPC); User Equipment (UE) conformance specification; Part 1: Protocol conformance specification (Release 15)', 3GPP TS 36.523-1 V15.4.0, Dec. 19, 2018. Sections 24.1.6-24.1.7.

* cited by examiner

METHOD AND APPARATUS FOR PERFORMING RADIO LINK MONITORING TO SUPPORT V2X COMMUNICATION IN NEXT-GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2019-0005740, filed on Jan. 16, 2019, in the Korean Intellectual Property Office, the disclosure of which is incorporated by reference herein in its entirety.

BACKGROUND

1. Field

The disclosure relates to a mobile communication system. More particularly, the disclosure relates to a method for performing radio link monitoring to support V2X communication.

2. Description of Related Art

In order to meet wireless data traffic demands that have increased after 4G communication system commercialization, efforts to develop an improved 5th generation (5G) communication system or a pre-5G communication system have been made. For this reason, the 5G communication system or the pre-5G communication system is called a beyond 4th generation (4G) network communication system or a post long-term evolution (LTE) system. In order to achieve a high data transmission rate, an implementation of the 5G communication system in a mmWave band (for example, 60 GHz band) is being considered. In the 5G communication system, technologies, such as beamforming, massive multiple-input and multiple-output (MIMO), Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies, such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes, such as Hybrid FSK and QAM Modulation (FQAM) and Sliding Window Superposition Coding (SWSC), and advanced access technologies, such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components, such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors, such as a detection technique, wired/wireless communication, network infrastructure, service-interface technology, and security technology are required, and research on technologies, such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as those of a smart home, a smart building, a smart city, a smart car, a connected car, a smart grid, health care, a smart home appliance, or high-tech medical services through the convergence of the Information Technology (IT) of the related art and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for managing a sidelink, based on radio link monitoring (RLM) when next-generation mobile communication system (NR) user equipment (UE)-UE Vehicle-to-everything (V2X) sidelink (SL) unicast communication is performed.

Additional aspects will be set forth in part in the description which follows and, in part, will be apparent from the description, or may be learned by practice of the presented embodiments.

In accordance with an aspect of the disclosure, a method performed by a first user equipment (UE) in a wireless communication system is provided. The method includes performing a communication with a second UE via a sidelink, identifying whether a condition related to a radio link failure (RLF) for the sidelink is satisfied, releasing the communication with the second UE for the sidelink, in case that the condition is satisfied, and transmitting, to a base station, information on the RLF for the sidelink, in case that the first UE is radio resource control (RRC)-connected with the base station.

In accordance with another aspect of the disclosure, a first UE in a wireless communication system is provided. The first UE includes a transceiver, and at least one processor configured to control the transceiver to perform a communication with a second UE via a sidelink, identify whether a condition related to a radio link failure (RLF) for the sidelink is satisfied, control the transceiver to release the communication with the UE for the sidelink in case that the condition is satisfied, and control the transceiver to transmit, to a base station, information on the RLF for the sidelink, in case that the first UE is radio resource control (RRC)-connected with the base station.

According to this technology, it is possible to manage a sidelink in an efficient and improved manner when NR V2X SL unicast communication is performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
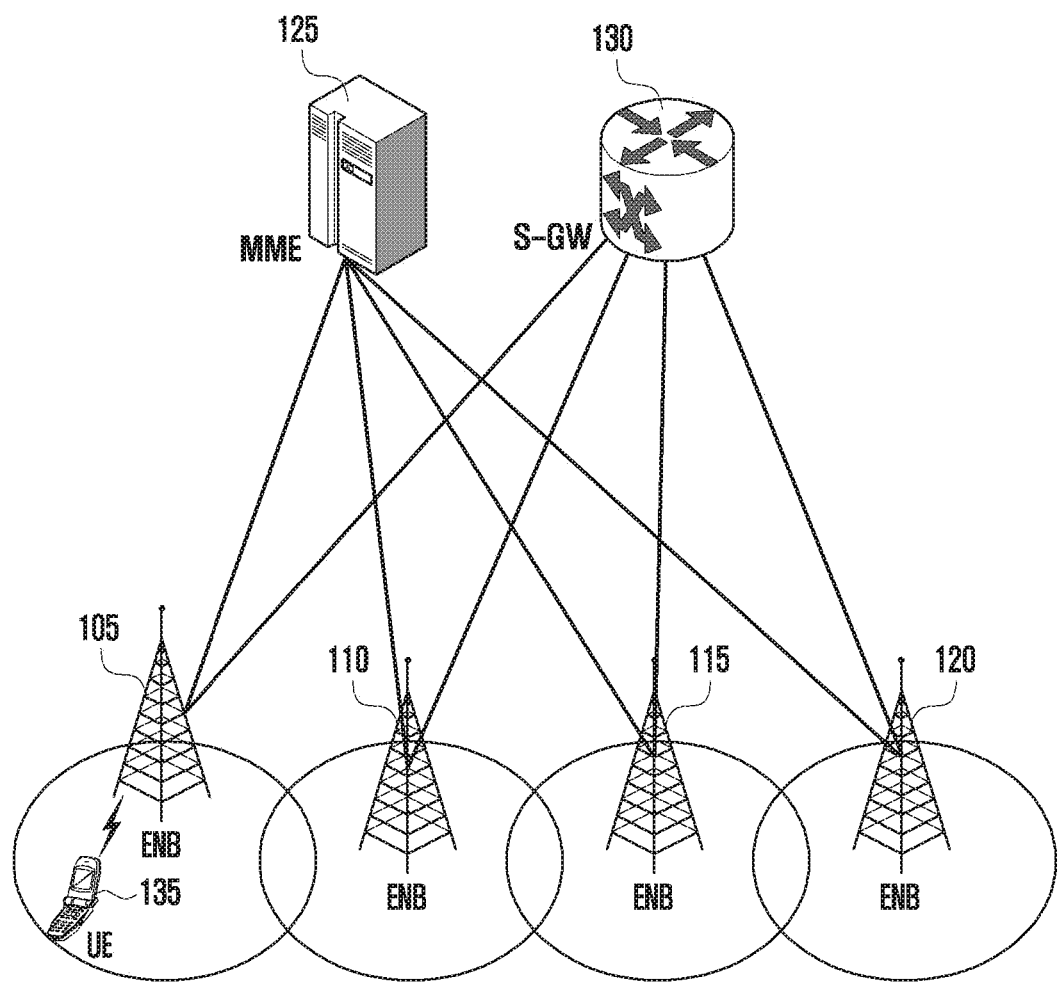
FIG. 1 illustrates a structure of a long-term evolution (LTE) system according to an embodiment of the disclosure.

FIG. 1 illustrates the structure of a long-term evolution (LTE) system according to an embodiment of the disclosure.

Referring to FIG. 1, a radio access network of the LTE system may include an evolved node B (hereinafter, referred to as an eNB, a Node B, or a base station) 105, 110, 115, or 120, a mobility management entity (MME) 125, and a serving gateway (S-GW) 130. A user equipment (hereinafter, referred to as a UE or terminal) 135 may access an external network through the eNBs 105 to 120 and the S-GW 130.

In FIG. 1, the eNBs 105 to 120 correspond to existing nodes B of a universal mobile telecommunication system (UMTS). The eNBs may be connected to the UE 135 over a wireless channel and may perform a more complex role than that of the existing Nodes B. In the LTE system, all user traffic including a real-time service, such as a voice over Internet protocol (VoIP) service, is provided through a shared channel. Therefore, a device that collects state information, such as UEs' buffer status, available transmission power state, and channel state, and performs scheduling is required. The eNBs 105 to 120 may be responsible for these functions.

One eNB may generally control a plurality of cells. For example, in order to realize a transmission speed of 100 Mbps, the LTE system may use orthogonal frequency division multiplexing (OFDM) as a radio access technology, for example, at a bandwidth of 20 MHz. In addition, the LTE system may apply adaptive modulation & coding (AMC), which determines a modulation scheme and a channel coding rate according to the channel state of a UE.

The S-GW 130 is a device that provides a data bearer and may generate or remove a data bearer under the control of the MME 125. The MME is a device that performs not only a mobility management function for the UE but also various control functions and may be connected to a plurality of base stations.

Figure 2:
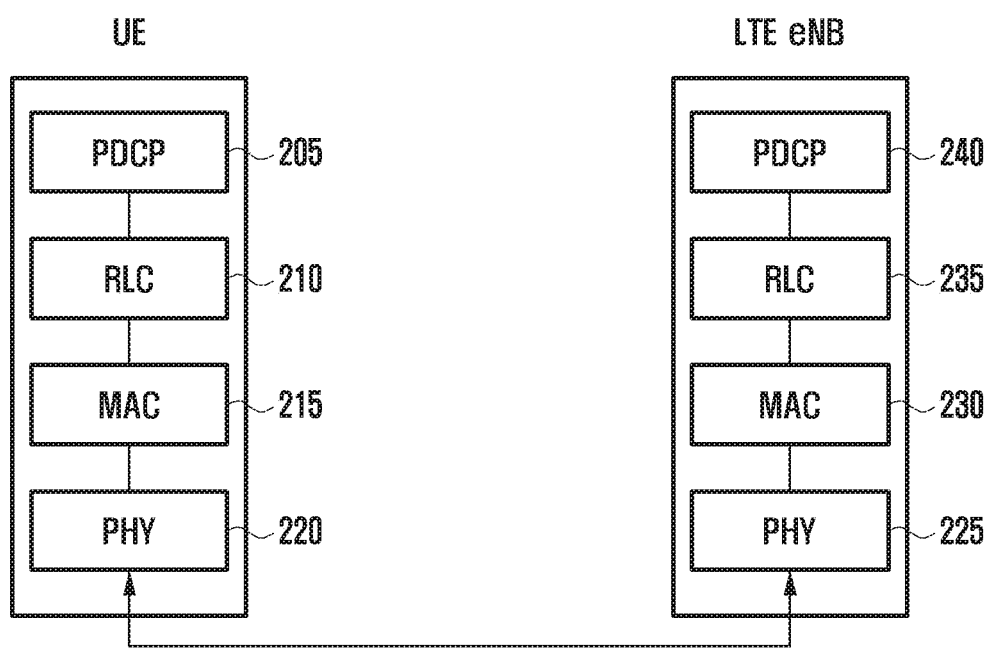
FIG. 2 illustrates a wireless protocol structure of an LTE system according to an embodiment of the disclosure.

FIG. 2 illustrates a wireless protocol structure of an LTE system according to an embodiment of the disclosure.

Referring to FIG. 2, a wireless protocol of the LTE system may include packet data convergence protocols (PDCPs) 205 and 240, radio link controls (RLCs) 210 and 235, and medium access controls (MACs) 215 and 230 respectively at a UE and an eNB. The PDCPs may be responsible for IP header compression/decompression or the like. Main functions of the PDCPs may be summarized as follows.

- Header compression and decompression (ROHC only)
- Transfer of user data
- In-sequence delivery of upper-layer PDUs at PDCP re-establishment procedure for RLC AM
- For split bearers in DC (only support for RLC AM), PDCP PDU routing for transmission and PDCP PDU reordering for reception
- Duplicate detection of lower-layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLCs 210 and 235 may reconstruct a PDCP packet data unit (PDU) into a proper size and may perform an automatic repeat request (ARQ) operation. Main functions of the RLCs may be summarized as follows.

Transfer of upper-layer PDUs

Error Correction through ARQ (only for AM data transfer)

Concatenation, segmentation, and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MACs 215 and 230 may be connected to a plurality of RLC-layer devices configured in one UE, may multiplex RLC PDUs into a MAC PDU, and may demultiplex a MAC PDU into RLC PDUs. Main functions of the MACs may be summarized as follows.

Mapping between logical channels and transport channels

Multiplexing/demultiplexing of MAC SDUs belonging to one or different logical channels into/from Transport Blocks (TBs) delivered to/from the physical layer on transport channels Scheduling information reporting Error correction through HARQ Priority handling between logical channels of one UE Priority handling between UEs by means of dynamic scheduling MBMS service identification Transport format selection Padding Physical (PHY) layers 220 and 225 may perform channel coding and modulation of upper-layer data and may convert the data into OFDM symbols to transmit the OFDM symbols via a wireless channel, or may demodulate OFDM symbols received via a wireless channel and may perform channel decoding of the OFDM symbols to deliver the OFDM symbols to an upper layer.

Figure 3:
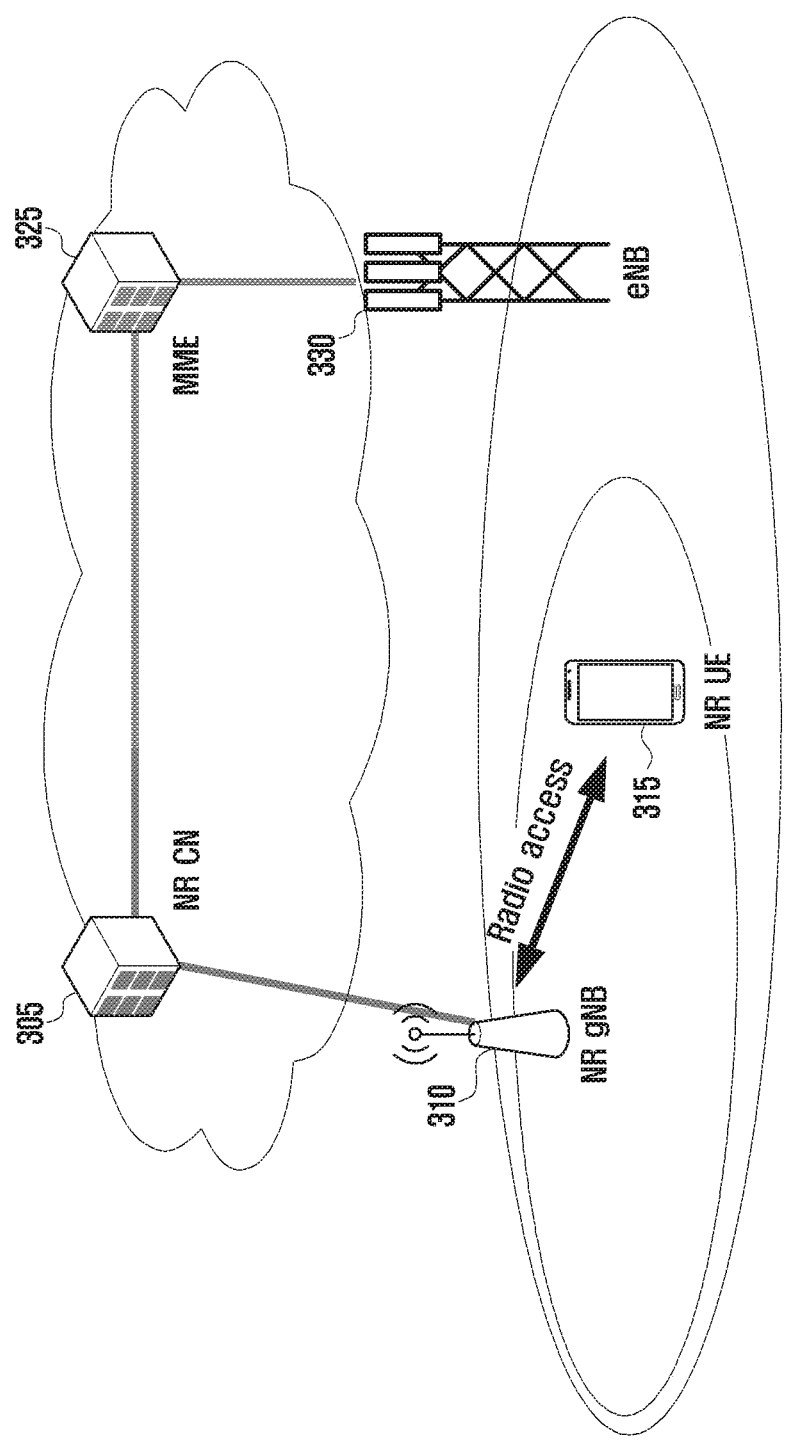
FIG. 3 illustrates a structure of a next-generation mobile communication system according to an embodiment of the disclosure.

FIG. 3 illustrates a structure of a next-generation mobile communication system according to an embodiment of the disclosure.

Referring to FIG. 3, a radio access network of the next-generation mobile communication system (hereinafter, referred to as NR or 5G) may include a new radio node B (hereinafter, an NR, gNB, or NR base station) 310 and a new radio core network (NR CN) 305. A new radio user equipment (hereinafter, an NR UE or terminal) 315 may access an external network through the NR gNB 310 and the NR CN 305.

In FIG. 3, the NR gNB 310 may correspond to an evolved node B (eNB) of an existing LTE system. The NR gNB is connected to the NR UE 315 over a wireless channel and may provide a more advanced service than that of the existing eNB. In the next-generation mobile communication system, all user traffic may be served through a shared channel. Therefore, a device that collects state information, such as UEs' buffer status, available transmission power state, and channel state, and performs scheduling is required. The NR gNB 310 may be responsible for these functions. One NR gNB may generally control a plurality of cells.

The next-generation mobile communication system may apply a bandwidth greater than the existing maximum bandwidth in order to realize ultrahigh-speed data transmission compared to current LTE. Further, the next-generation mobile communication system may employ a beamforming technique in addition to OFDM as a radio access technology. In addition, the next-generation mobile communication system may apply AMC, which determines a modulation scheme and a channel coding rate according to the channel state of a UE.

The NR CN 305 may perform functions of mobility support, bearer setup, and QoS setup. The NR CN is a device that performs not only a mobility management function for a UE but also various control functions and may be connected to a plurality of base stations. The next-generation mobile communication system may also interwork with the existing LTE system, in which case the NR CN may be connected to an MME 325 through a network interface. The MME is connected to the eNB 330, which is an existing base station.

Figure 4:
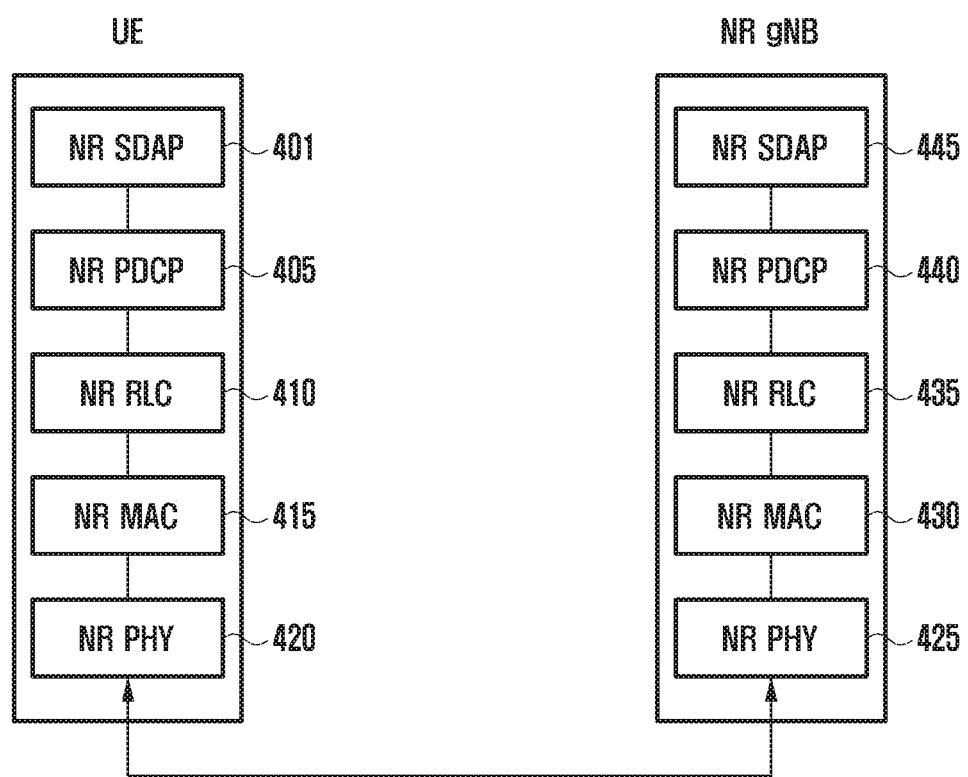
FIG. 4 illustrates a wireless protocol structure of a next-generation mobile communication system according to an embodiment of the disclosure.

FIG. 4 illustrates a wireless protocol structure of a next-generation mobile communication system according to an embodiment of the disclosure.

Referring to FIG. 4, a wireless protocol of the next-generation mobile communication system includes NR service data adaptation protocols (SDAPs) 401 and 445, NR PDCPs 405 and 440, NR RLCs 410 and 435, and NR MACs 415 and 430, and NR PHYs 420 and 425 respectively at a UE and an NR base station.

Main functions of the NR SDAPs 401 and 445 may include some of the following functions.

Transfer of user plane data

Mapping between QoS flow and DRB for both DL and UL

Marking QoS flow ID in both DL and UL packets

Reflective QoS flow-to-DRB mapping for UL SDAP PDUs

Regarding the SDAP-layer devices, the UE may receive a configuration about whether to use a header of the SDAP-layer devices or whether to use a function of the SDAP-layer devices for each PDCP-layer device, each bearer, or each logical channel via a radio resource control (RRC) message. When an SDAP header is configured, a one-bit non-access stratum (NAS) quality of service (QoS) reflective indicator (NAS reflective QoS) and a one-bit AS QoS reflective indicator (AS reflective QoS) of the SDAP header may be used for indication to enable the UE to update or reconfigure uplink and downlink QoS flows and mapping information for a data bearer. The SDAP header may include QoS flow ID information indicating QoS. The QoS information may be used as a data processing priority, scheduling information, and the like in order to support a desired service.

Main functions of the NR PDCPs 405 and 440 may include some of the following functions.

Header compression and decompression (ROHC only)

Transfer of user data

In-sequence delivery of upper-layer PDUs

Out-of-sequence delivery of upper-layer PDUs

PDCP PDU reordering for reception

Duplicate detection of lower-layer SDUs

Retransmission of PDCP SDUs

Ciphering and deciphering

Timer-based SDU discard in uplink.

Among the above functions, the reordering function of the NR PDCP devices refers to a function of rearranging PDCP PDUs received in a lower layer in order based on the PDCP sequence number (SN). The reordering function of the NR PDCP devices may include a function of transmitting the data to an upper layer in the order of rearrangement or a function of immediately transmitting the data regardless of order. In addition, the reordering function may include a function of recording lost PDCP PDUs via reordering, may include a function of reporting the state of lost PDCP PDUs to a transmitter, and may include a function of requesting retransmission of lost PDCP PDUs.

Main functions of the NR RLCs 410 and 435 may include some of the following functions.
  Transfer of upper-layer PDUs
  In-sequence delivery of upper-layer PDUs
  Out-of-sequence delivery of upper-layer PDUs
  Error Correction through ARQ
  Concatenation, segmentation, and reassembly of RLC SDUs
  Re-segmentation of RLC data PDUs
  Reordering of RLC data PDUs
  Duplicate detection
  Protocol error detection
  RLC SDU discard
  RLC re-establishment Among the above functions, the in-sequence delivery function of the NR RLC devices refers to a function of delivering RLC SDUs received from a lower layer to an upper layer in order. The in-sequence delivery function of the NR RLC devices may include a function of reassembling and delivering a plurality of RLC SDUs when one original RLC SDU is divided into the plurality of RLC SDUs to be received.

The in-sequence delivery function of the NR RLC devices may include a function of rearranging received RLC PDUs based on the RLC SN or the PDCP SN, may include a function of recording lost RLC PDUs via reordering, may include a function of reporting the state of lost RLC PDUs to a transmitter, may include a function of requesting retransmission of lost RLC PDUs.

If there is a lost RLC SDU, the in-sequence delivery function of the NR RLC devices 410 and 435 may include may include a function of delivering only RLC SDUs before the lost RLC SDU to an upper layer in order. Further, the in-sequence delivery function of the NR RLC devices may include a function of delivering all RLC SDUs, received before a timer starts, to an upper layer in order when the timer has expired despite the presence of a lost RLC SDU. Further, he in-sequence delivery function of the NR RLC devices may include a function of delivering all RLC SDUs received so far to an upper layer in order when the timer expires despite the presence of a lost RLC SDU.

The NR RLC devices 410 and 435 may process RLC PDUs in order of reception regardless of the order of SNs and may deliver the RLC PDUs to the NR PDCP devices 405 and 440 in an out-of-sequence manner.

When receiving a segment, the NR RLC devices 410 and 435 may receive segments that are stored in a buffer or are to be received later, may reconstruct the segments into one whole RLC PDU, and may deliver the RLC PDU to the NR PDCP devices.

The NR RLC layers may not include a concatenation function, and the concatenation function may be performed in the NR MAC layers or may be replaced with a multiplexing function of the NR MAC layers.

The out-of-sequence delivery function of the NR RLC devices refers to a function of delivering RLC SDUs received from a lower layer directly to an upper layer regardless of order.

The out-of-sequence delivery function of the NR RLC devices may include a function of reassembling and delivering a plurality of RLC SDUs when one original RLC SDU is divided into the plurality of RLC SDUs to be received. In addition, the out-of-sequence delivery function of the NR RLC devices may include a function of recording lost RLC PDUs by storing and reordering the RLC SNs or PDCP SNs of received RLC PDUs.

The NR MACs 415 and 430 may be connected to a plurality of NR RLC-layer devices configured in one device, and main functions of the NR MACs may include some of the following functions.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layers 420 and 425 may perform channel coding and modulation of upper-layer data and convert the data into OFDM symbols to transmit the OFDM symbols via a wireless channel, or demodulate OFDM symbols received via a wireless channel and perform channel decoding of the OFDM symbols to deliver the OFDM symbols to an upper layer.

Figure 5:
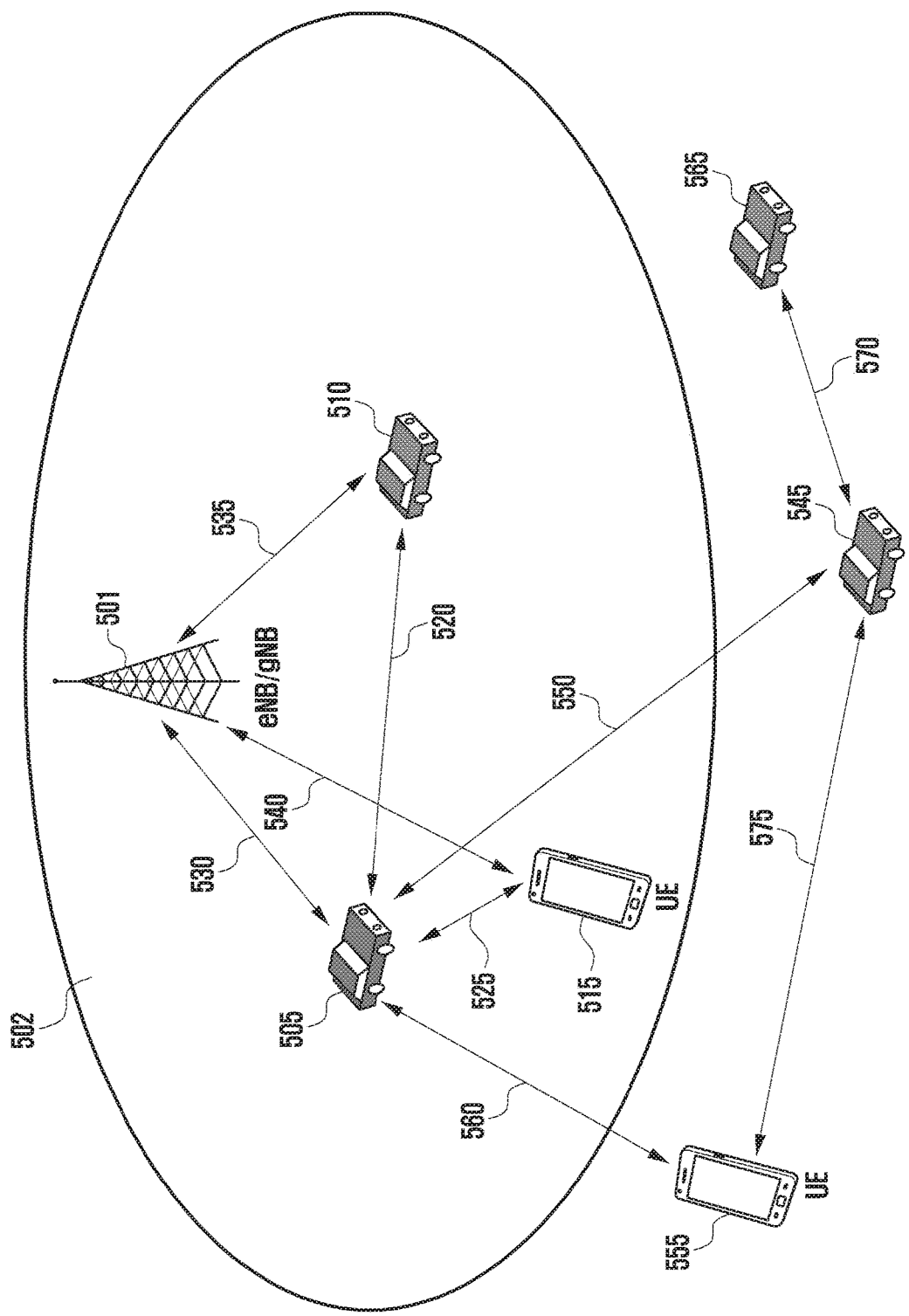
FIG. 5 illustrates Vehicle-to-everything (V2X) communication in a next-generation mobile communication system according to an embodiment of the disclosure.

FIG. 5 illustrates V2X communication in a next-generation mobile communication system according to an embodiment of the disclosure.

Vehicle-to-everything (V2X) according to the embodiment collectively refers to a communication technology through a vehicle and all interfaces and may be vehicle-to-vehicle (V2V), vehicle-to-infrastructure (V2I), vehicle-to-pedestrian (V2P), vehicle-to-network (V2N), and the like according to the form and components for establishing communication.

Referring to FIG. 5, a base station 501 may include at least one vehicle terminal 505 or 510 and a portable UE 515 located in a cell 502 supporting V2X. Here, V2X may be supported through a Uu interface and/or a PC5 interface.

When V2X is supported through the Uu interface, for example, the vehicle terminal 505 or 510 may perform V2X cellular communication with the base station 501 using a vehicle terminal-base station uplink (UL)/downlink (DL) 530 or 535, or the portable UE 515 may perform V2X cellular communication using a portable UE-base station uplink (UL)/downlink (DL) 540.

When V2X is supported through the PC5 interface, V2X sidelink (SL) communication may be performed using a UE-UE sidelink (SL) 520 and 525. For example, the vehicle terminal 505 in the coverage area of the base station (E-UTRA/NR) may transmit and receive V2X packets to and from other vehicle terminals 510 and 540 and/or portable UEs 515 and 555 through SLs 520, 550, 525, and 560 as transmission channels. The V2X packets may be transmitted and received in a broadcast transmission type and/or a unicast and/or groupcast transmission type.

A UE supporting V2X sidelink communication may transmit and receive a V2X packet according to a resource allocation mode (scheduled resource allocation or UE autonomous resource selection).

Scheduled resource allocation (mode 1 and/or mode 3) is a mode in which a base station allocates a resource used for sidelink transmission to a UE in an RRC-connected mode by a dedicated scheduling scheme. This mode enables the base station to manage sidelink resources and may thus efficient for interference management and/or management of a resource pool (dynamic allocation and semi-persistence transmission).

When there is data to be transmitted to other UE(s), the UE in the RRC-connected mode may report that there is data to be transmitted to other UE(s) to the base station using an RRC message or a MAC control element (hereinafter, "CE"). For example, the RRC message may be a SidelinkUEInformation or UEAssistanceInformation message, and the MAC CE may be a buffer status report MAC CE in a new format (including at least an indicator indicating that a buffer status report is for V2X communication and information about the size of data buffered for sidelink communication).

UE autonomous resource selection (mode 2 and/or mode 4) is a mode in which a base station provides sidelink resource information/pool to a UE supporting V2X sidelink communication via system information and/or an RRC message and the UE selects a resource according to a set rule. For example, the base station may provide sidelink resource information to the UE by signaling SIB21, SIB26, or SIBx to be newly defined for an NR V2X UE. The base station may provide sidelink resource information by signaling an RRC message, for example, an RRC connection reconfiguration message (RRCReconfiguration message) and/or connection resumption message (RRCResume message), to the UE.

Further, UE autonomous resource selection may enable the UE to assist other UEs in selecting a resource to be used for a sidelink through a PC5 RRC message and/or MAC CE or may allocate a resource to be used for sidelink transmission through direct or indirect scheduling. For example, the UE autonomous resource selection mode may refer to one or more of the following.

UE autonomously selects sidelink resource for transmission

UE assists sidelink resource selection for other UEs

UE is configured with NR configured grant for sidelink transmission

UE schedules sidelink transmission of other UEs

Resource selection methods for a UE may include zone mapping, detection-based resource selection, random selection, configured grant-based resource selection, and the like.

The UE supporting V2X sidelink communication may transmit and receive a V2X packet, based on a preconfigured resource pool (preconfigured resource) included in SL-V2X-Preconfiguration, which is an information element (hereinafter, "IE"). For example, when the UE exists in the coverage area of the base station but cannot perform V2X sidelink communication based on the scheduled resource allocation and/or UE autonomous resource selection mode for some reason, the UE may perform V2X sidelink communication through a sidelink transmission/reception resource pool preconfigured in SL-V2X-Preconfiguration as the IE.

In addition, a vehicle terminal 545 out of the coverage area of E-UTRA/NR vehicle terminal 545 may perform V2X sidelink communication with another vehicle terminal 565 or a portable UE 555, based on the foregoing preconfigured sidelink resource, through sidelinks (SL) 570 and 575 as transmission channels.

LTE V2X SL communication is designed primarily for basic safety services. For example, a UE supporting the LTE V2X SL communication is designed to provide basic safety services to all neighboring UEs supporting LTE V2X SL communication through a broadcast transmission type. Therefore, the UE does not need to perform a process for establishing a session with another particular UE or to perform a sidelink connection establishment procedure.

However, in next-generation mobile communication (NR), V2X SL communication may be designed to provide not only basic safety services but also various and enhanced services (e.g., a self-driving service, a platooning service, a remote driving services, or an in-vehicle infotainment service). Therefore, NR V2X SL communication may be designed to support not only a broadcast transmission type but also a unicast and/or groupcast transmission type.

Figure 6:
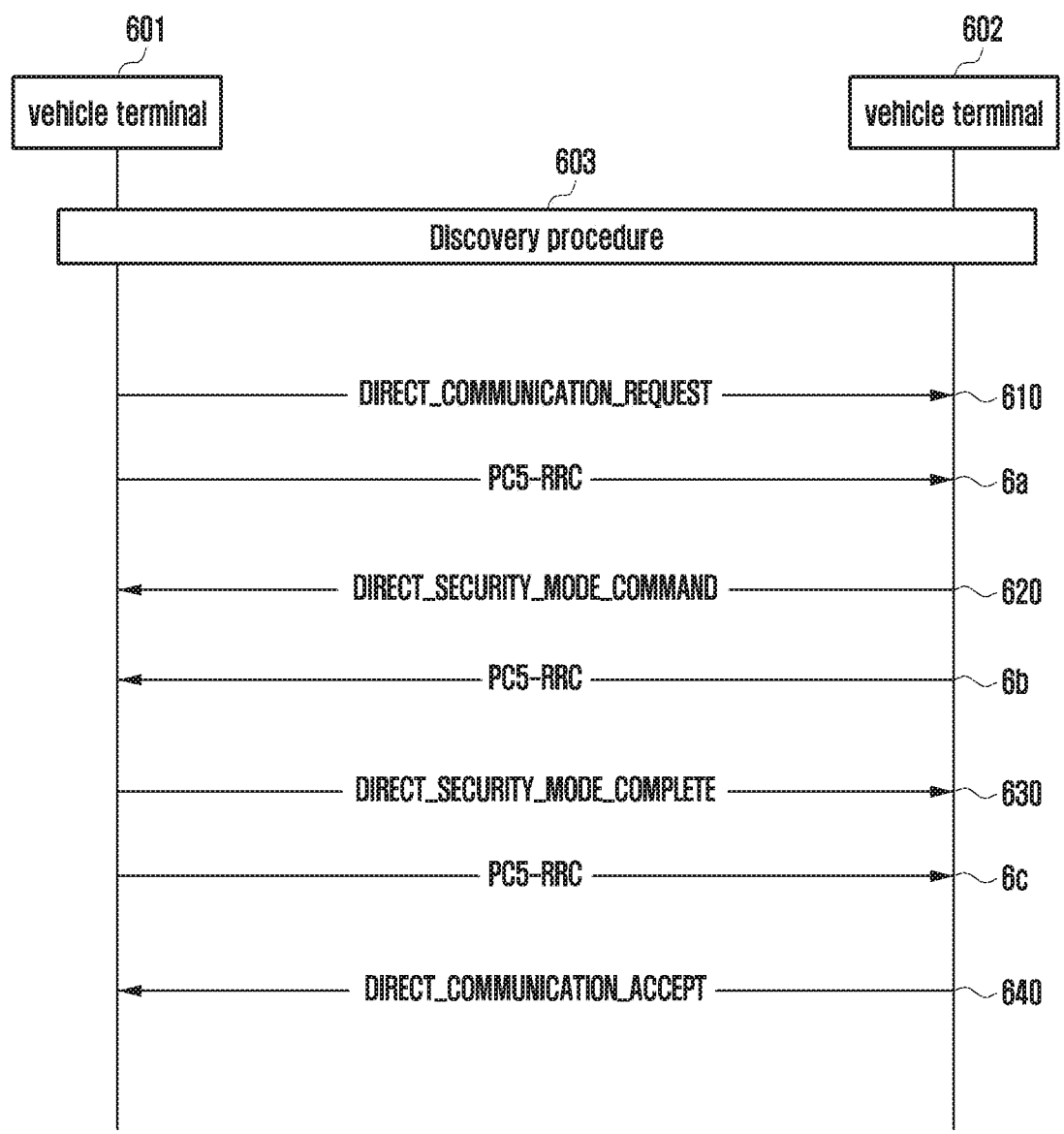
FIG. 6 illustrates a unicast link establishment procedure for supporting next-generation mobile communication system (NR) V2X sidelink (SL) unicast according to an embodiment of the disclosure.

FIG. 6 illustrates a unicast link establishment procedure for supporting NR V2X SL unicast according to an embodiment of the disclosure.

Referring to FIG. 6, to establish a UE-UE unicast link, a vehicle terminal 601 may perform a discovery procedure with a different vehicle terminal 602 (603). Accordingly, the vehicle terminal 601 may obtain a link layer identifier of the different vehicle terminal 602. For example, the link layer identifier may refer to a layer-2 ID, a destination layer-2 ID or a destination ID used for NR V2X SL unicast communication.

When operation 603 is completed, the vehicle terminal 601 may perform an upper-layer connection establishment procedure and/or an AS-layer connection establishment procedure in order to establish a UE-UE sidelink connection with the different vehicle terminal 602. In the disclosure, for convenience of explanation, after the upper-layer connection establishment procedure is described, the AS-layer connection establishment procedure is described. However, the upper-layer connection establishment procedure and the AS-layer connection establishment procedure may be independently performed, may be performed in parallel, or may be performed through a series of processes.

The upper-layer connection establishment procedure may be performed through the following series of processes 610, 620, 630, and 640 between the terminals, based on a PC5 signaling protocol procedure defined in Rel-15 D2D.

The vehicle terminal 601 transmits a DIRECT_COMMUNICATION_REQUEST message to the different vehicle terminal 602 (610):

This message is a first PC5 signaling message that the vehicle terminal 601 transmits to the different vehicle terminal 602 in order to request establishment of a direct link (which is generated in the PC5 signaling protocol and is thus referred to as a PC5 signaling message).

The vehicle terminal 601 receives a DIRECT_SECURITY_MODE_COMMAND message from the different vehicle terminal 602 (620):

This message is a first PC5 signaling message that the different vehicle terminal 602 transmits to the vehicle terminal 601 in order to establish a direct security mode in a direct link establishment process (which is generated in the PC5 signaling protocol and is thus referred to as a PC5 signaling message).

The vehicle terminal 601 transmits a DIRECT_SECURITY_MODE_COMPLETE message to the different vehicle terminal 602 (630):

This message is a PC5 signaling message for the vehicle terminal 601 to report to the different vehicle terminal 602 that the direct security mode is successfully established/completed in the direct link establishment process (which is generated in the PC5 signaling protocol and is thus referred to as a PC5 signaling message).

The vehicle terminal 601 transmits a DIRECT_COMMUNICATION_ACCEPT message to the different vehicle terminal 602 (640):

This message is a PC5 signaling message for the vehicle terminal 601 to report to the different vehicle terminal 602 that a direct link is successfully established (which is generated in the PC5 signaling protocol and is thus referred to as a PC5 signaling message).

The PC5 signaling messages transmitted and received in the foregoing upper-layer connection establishment procedure may include or may not include only some AS-layer parameters and configuration information necessary to establish a V2X sidelink connection between the terminals. Therefore, in order to establish the V2X sidelink connection between the terminals, not only the foregoing upper-layer connection establishment procedure but also an AS-layer connection establishment procedure may be required.

The AS-layer connection establishment procedure according to an embodiment may refer to exchanging an AS-layer parameter and configuration information necessary for the vehicle terminal 601 and the different vehicle terminal 602 to establish the V2X sidelink connection or to perform NR V2X SL unicast communication through PC5 RRC message s. The PC5 RRC message s may be generated in an RRC layer and may be transmitted and received through a logical channel to be newly defined in NR. In one example, the logical channel may be referred to as a sidelink control channel (SCCH).

PC5 RRC message s 6a and/or 6b and/or 6c according to an embodiment may include at least one of the following AS-layer parameters and configuration information.

An indicator or IE to ask or indicate whether V2X SL unicast communication is supported (or intended) or whether it is (or intended).

Through the indicator or IE, it is possible to identify whether V2X sidelink communication between terminals is performed by unicast. For example, the vehicle terminal 601 may transmit a PC5 RRC message to the different vehicle terminal 602 to ask whether the different vehicle terminal 602 supports V2X SL unicast. In response, the different vehicle terminal 602 may transmit a PC5 RRC message to the vehicle terminal 601 to indicate that the different vehicle terminal 602 can perform communication via V2X SL unicast.

UE ID: UE identifier

The UE ID makes it possible terminals which are to perform or performs V2X sidelink unicast communication to identify each other. For example, the UE ID may refer to a source layer-2 ID and/or a destination layer-2 ID of a target UE for unicast (in this example, the target UE may be the vehicle terminal 601 and/or the different vehicle terminal 602). Alternatively, the UE ID may be a new radio network temporary identifier (RNTI) for identifying terminals, and an HARQ process between terminals may be performed based on the corresponding RNTI.

Radio bearer configuration: Radio bearer configuration information

Through the radio bearer configuration information, an SRB ID for an SRB and/or a DRB ID for a DRB and/or PDCP layer-related configuration information and/or SDAP layer-related configuration information, which are used for NR V2X SL unicast communication between vehicle terminals, may be exchanged. For example, the radio bearer configuration information may include some or all of information elements (IEs), such as srb-ToAddModList, drb-ToAddModList, drb-ToReleaseList, securityConfig, and the like.

RLC bearer configuration: RLC bearer configuration information

Through the RLC bearer configuration information, an ID for an SRB and/or DRB, a logical channel ID (LCH-ID), an indicator indicating whether an RLC layer needs to be reestablished, RLC layer-related configuration information, and MAC-logical channel establishment configuration information, which are used for NR V2X SL unicast communication between vehicle terminals, may be exchanged.

Configuration information for performing HARQ process

Through this information, retransmission may be performed through a HARQ process in NR V2X SL unicast communication between vehicle terminals. For example, the information may include a timer, a retransmission period, and the like necessary for retransmission.

RLF timers and constant configuration: RLF timer values and relevant constant value configuration information The RLF timer values and relevant constant value configuration information may include information about a condition for detecting a RLF in NR V2X SL unicast communication between vehicle terminals. The information may include at least one of values for A, B, C, D, E, and F illustrated below.

In NR V2X SL unicast communication, a lower layer of a vehicle terminal may transmit an out-of-sync indication to an upper layer for some reason. For example, when the vehicle terminal continuously fails to decode a physical sidelink control channel (PSCCH) during slot A, the lower layer of the vehicle terminal may transmit the out-of-sync indication to the upper layer. When the upper layer of the vehicle terminal consecutively receives the out-of-sync indication from the lower layer B times, the vehicle terminal may operate timer C. While timer C is operating, the lower layer of the vehicle terminal may transmit an in-sync indication to the upper layer for some reason. For example, when the vehicle terminal consecutively succeeds in decoding a PSCCH during slot D, the lower layer of the vehicle terminal may transmit an in-sync indication to the upper layer. When the upper layer of the vehicle terminal consecutively receives the in-sync indication from the lower layer E times, the vehicle terminal may stop operating timer C. When operating timer C expires, the vehicle terminal may detect that an RLF occurs in a V2X sidelink connected for the NR V2X unicast communication. When the RLF is identified, the vehicle terminal may operate timer F. Operating timer F may be stopped when receiving a PC5 signaling message, when transmitting a PC5 RRC message, when receiving a PC5 RRC message, when transmitting a PC5 MAC CE, or when receiving a PC5 MAC CE.

A, B, C, D, E, and F illustrated above may have the following values.

A:

One of one or a plurality of values indicating the number of slots may be included in the PC5 RRC message. In one example, A may be represented by ENUMERATED {n1, n2, n3, . . . }, where n1, n2, and n3 are values indicating the number of slots.

A plurality of values among a plurality of values indicating the number of slots may be included in the PC5 RRC message. In one example, A may be represented by SEQUENCE (SIZE (1, ..., m)) of a, where a may be represented by ENUMERATED {n1, n2, n3, ...}. Here, A may refer to a list or a set of a plurality of values (m) indicating the number of slots. The reason why a plurality of slot values is required is that QoS requirements for individual NR V2X use cases may be different or may be set differently for individual NR V2X SL unicast sessions.

B:

One of one or a plurality of constant values may be included in the PC5 RRC message. In one example, B may be represented by ENUMERATED {n1, n2, n3, ...}, where n1, n2, and n3 are constant values.

A plurality of constant values among a plurality of constant values may be included in the PC5 RRC message. In one example, B may be represented by SEQUENCE (SIZE (1, ..., m)) of b, where b may be represented by ENUMERATED {n1, n2, n3, ...}. Here, B may refer to a list or a set of a plurality of constant values (m). The reason why a plurality of constant values is required is that QoS requirements for individual NR V2X use cases may be different or may be set differently for individual NR V2X SL unicast sessions.

B may also refer to N310 used for a Uu interface and may be a new constant value(s) separately used for a PC5 interface. In the latter case, B may have a wider range of constant values than that of constant values defined in N310, may have the same range of constant values, or may have a smaller range of constant values.

C:

One of one or a plurality of values indicating a timer value may be included in the PC5 RRC message. In one example, C may be represented by ENUMERATED {n1, n2, n3, ...}, where n1, n2, and n3 are time/timer values, and the unit may be millisecond (ms).

A plurality of a plurality of values indicating a timer value may be included in the PC5 RRC message. C may be represented by SEQUENCE (SIZE (1, ..., m)) of c, where c is represented by ENUMERATED {n1, n2, n3, ...}. Here, C may refer to a list or a set of a plurality of timer/time values (m). The reason why a plurality of timer/time values is required is that that QoS requirements for individual NR V2X use cases may be different or may be set differently for individual NR V2X SL unicast sessions.

C may also refer to T310 used for a Uu interface and may be a new value(s) separately used for a PC5 interface. In the latter case, C may have a wider range of values than that of values defined in T310, may have the same range, or may have a smaller range.

D:

One of one or a plurality of values indicating the number of slots may be included in the PC5 RRC message. In one example, D may be represented by ENUMERATED {n1, n2, n3, ...}, where n1, n2, and n3 are values indicating the number of slots.

A plurality of values among a plurality of values indicating the number of slots may be included in the PC5 RRC message. In one example, D may be represented by SEQUENCE (SIZE (1, ..., m)) of d, where d may be represented by ENUMERATED {n1, n2, n3, ...}. Here, D may refer to a list or a set of a plurality of values (m) indicating the number of slots. The reason why a plurality of slot values is required is that QoS requirements for individual NR V2X use cases may be different or may be set differently for individual NR V2X SL unicast sessions.

E:

One of one or a plurality of constant values may be included in the PC5 RRC message. In one example, E may be represented by ENUMERATED {n1, n2, n3, ...}, where n1, n2, and n3 are constant values.

A plurality of constant values among a plurality of constant values may be included in the PC5 RRC message. In one example, E may be represented by SEQUENCE (SIZE (1, ..., m)) of e, where e may be represented by ENUMERATED {n1, n2, n3, ...}. Here, E may refer to a list or a set of a plurality of constant values (m). The reason why a plurality of constant values is required is that QoS requirements for individual NR V2X use cases may be different or may be set differently for individual NR V2X SL unicast sessions.

E may also refer to N311 used for a Uu interface and may be a new constant value(s) separately used for a PC5 interface. In the latter case, E may have a wider range of constant values than that of constant values defined in N311, may have the same range of constant values, or may have a smaller range of constant values.

F:

One of one or a plurality of values indicating a timer value may be included in the PC5 RRC message. In one example, F may be represented by ENUMERATED {n1, n2, n3, ...}, where n1, n2, and n3 are time/timer values, and the unit may be millisecond (ms).

A, B, C, D, E, and F illustrated above and/or the values thereof may always be mandatorily included in the PC5 RRC message or may be optionally included in the PC5 RRC message.

The foregoing A, B, C, D, E, F values may be included in an RRC message (e.g., an RRC connection reconfiguration message or an RRC connection resumption message) that a base station dedicatedly signals to a UE or may be included in system information.

QoS-related configuration information: 5G QoS indicator (5QI) or V2X QoS indicator (VQI) list/set Through the QoS-related configuration information, it is possible to indicate QoS information required for a desired V2X service in NR V2X SL unicast communication between vehicle terminals. For example, the QoS-related configuration information may include a 5QI or VQI list.

QoS-related configuration information: IE including ProSe per-packet priority (PPPP) and/or Prose per-packet reliability (PPPR) list and/or traffic pattern information Through the QoS-related configuration information, it is possible to indicate QoS information required for a desired V2X service in NR V2X SL unicast communication between vehicle terminals, to perform packet duplication, or to indicate information for performing SPS, ConfiguredGrant Type 1, or ConfiguredGrant Type 2. For example, the IE may include PPPPInfoSL and/or reliabilityInfoListSL and/or SL-V2X-PacketDuplicationConfig and/or trafficPatternInfoListSL.

IE including ProSe per-packet priority (PPPP) and/or Prose per-packet reliability (PPPR) list and/or traffic pattern information:

Through the IE, it is possible to indicate QoS information required for a desired V2X service in NR V2X SL unicast communication between vehicle terminals, to perform packet duplication, or to indicate information for performing SPS, ConfiguredGrant Type 1, or ConfiguredGrant Type 2. For example, the IE may include PPPPInfoSL and/or reliabilityInfoListSL and/or SL-V2X-PacketDuplicationConfig and/or trafficPatternInfoListSL.

IE including ProSe per-packet priority (PPPP) and/or Prose per-packet reliability (PPPR) list and/or traffic pattern information:

Through the IE, it is possible to indicate QoS information required for a desired V2X service in NR V2X SL unicast communication between vehicle terminals, to perform packet duplication, or to indicate information for performing SPS, ConfiguredGrant Type 1, or ConfiguredGrant Type 2. For example, the IE may include PPPPInfoSL and/or reliabilityInfoListSL and/or SL-V2X-PacketDuplicationConfig and/or trafficPatternInfoListSL.

Indicator or IE explicitly indicating whether to use a preconfigured transmission resource pool and/or reception resource pool:

Through the indicator or the IE, it is possible to identify whether to use a preconfigured transmission resource pool or reception resource pool or to use a resource allocation mode-based transmission resource pool and/or reception resource pool in NR V2X SL unicast communication between vehicle terminals.

Indicator explicitly indicating resource allocation mode or IE including information about resource allocation mode-based transmission resource pool and/or reception resource pool or some information about preconfigured transmission resource pool and/or reception resource pool:

Through the indicator or the IE, it is possible to identify whether to use some of a preconfigured transmission resource pool or reception resource pool or to use a resource allocation mode-based transmission resource pool and/or reception resource pool in NR V2X SL unicast communication between vehicle terminals.

The AS-layer connection establishment procedure according to the embodiment may be performed independently of the foregoing upper-layer connection establishment procedure, may be performed in parallel therewith, or may be performed therewith through a series of processes. Therefore, the disclosure proposes the time to transmit the PC5 RRC message s 6a, 6b, and 6c.

A first PC5 RRC message 6a that the vehicle terminal 601 transmits to the different vehicle terminal 602 in order to perform the AS-layer connection establishment procedure may be transmitted:

Before transmitting the DIRECT_COMMUNICATION_ REQUEST message 610;
Simultaneously with the DIRECT_COMMUNICATION_ REQUEST message 610;
Via multiplexing with the DIRECT_COMMUNICATION_REQUEST message 610;
After transmitting the DIRECT_COMMUNICATION_ REQUEST message 610;
After receiving the DIRECT_SECURITY_MODE_COMMAND message 620;
Before transmitting the DIRECT_SECURITY_MODE_COMPLETE message 630;
Simultaneously with the DIRECT_SECURITY_MODE_COMPLETE message 630;
Via multiplexing with the DIRECT_SECURITY_MODE_COMPLETE message 630;
After transmitting the DIRECT_SECURITY_MODE_COMPLETE message 630; or
After receiving the DIRECT_COMMUNICATION_ACCEPT message 640.

When the different vehicle terminal 602 receives the PC5 RRC message 6a from the vehicle terminal 601, the different vehicle terminal 602 may transmit a PC5 RRC message 6b to the vehicle terminal 601 in response. The PC5 RRC message 6b may be transmitted:

After receiving the PC5 RRC message 6a;
Before transmitting the DIRECT_SECURITY_MODE_COMMAND message 620;
Simultaneously with the DIRECT_SECURITY_MODE_COMMAND message 620;
Via multiplexing with the DIRECT_SECURITY_MODE_COMMAND message 620;
After transmitting the DIRECT_SECURITY_MODE_COMMAND message 620;
After receiving the DIRECT_SECURITY_MODE_COMPLETE message 630;
Before transmitting the DIRECT_COMMUNICATION_ ACCEPT message 640;
Simultaneously with the DIRECT_COMMUNICATION_ ACCEPT message 640;
Via multiplexing with the DIRECT_COMMUNICATION_ACCEPT message 640; or
After transmitting the DIRECT_COMMUNICATION_ ACCEPT message 640.

When the vehicle terminal 601 receives the PC5 RRC message 6b from the different vehicle terminal 602, the vehicle terminal 601 may transmit or may not transmit a PC5 RRC message 6c to the different vehicle terminal 602 in response. For example, when the AS-layer connection establishment procedure and the upper-layer connection establishment procedure are performed through one series of processes, the vehicle terminal 601 may respond to the PC5 RRC message 6b from the different vehicle terminal 602 via a PC5 signaling message and may thus not transmit the PC5 RRC message 6c. When the PC5 RRC message 6c needs to be transmitted, the PC5 RRC message 6c may be transmitted:

After receiving the PC5 RRC message 6b;
Before transmitting the DIRECT_COMMUNICATION_ REQUEST message 610;
Simultaneously with the DIRECT_COMMUNICATION_ REQUEST message 610;
Via multiplexing with the DIRECT_COMMUNICATION_REQUEST message 610;
After transmitting the DIRECT_COMMUNICATION_ REQUEST message 610;
After receiving the DIRECT_SECURITY_MODE_COMMAND message 620;
Before transmitting the DIRECT_SECURITY_MODE_COMPLETE message 630;
Simultaneously with the DIRECT_SECURITY_MODE_COMPLETE message 630;
Via multiplexing with the DIRECT_SECURITY_MODE_COMPLETE message 630; or
After transmitting the DIRECT_SECURITY_MODE_COMPLETE message 630; or
After receiving the DIRECT_COMMUNICATION_ACCEPT message 640.

Figure 7:
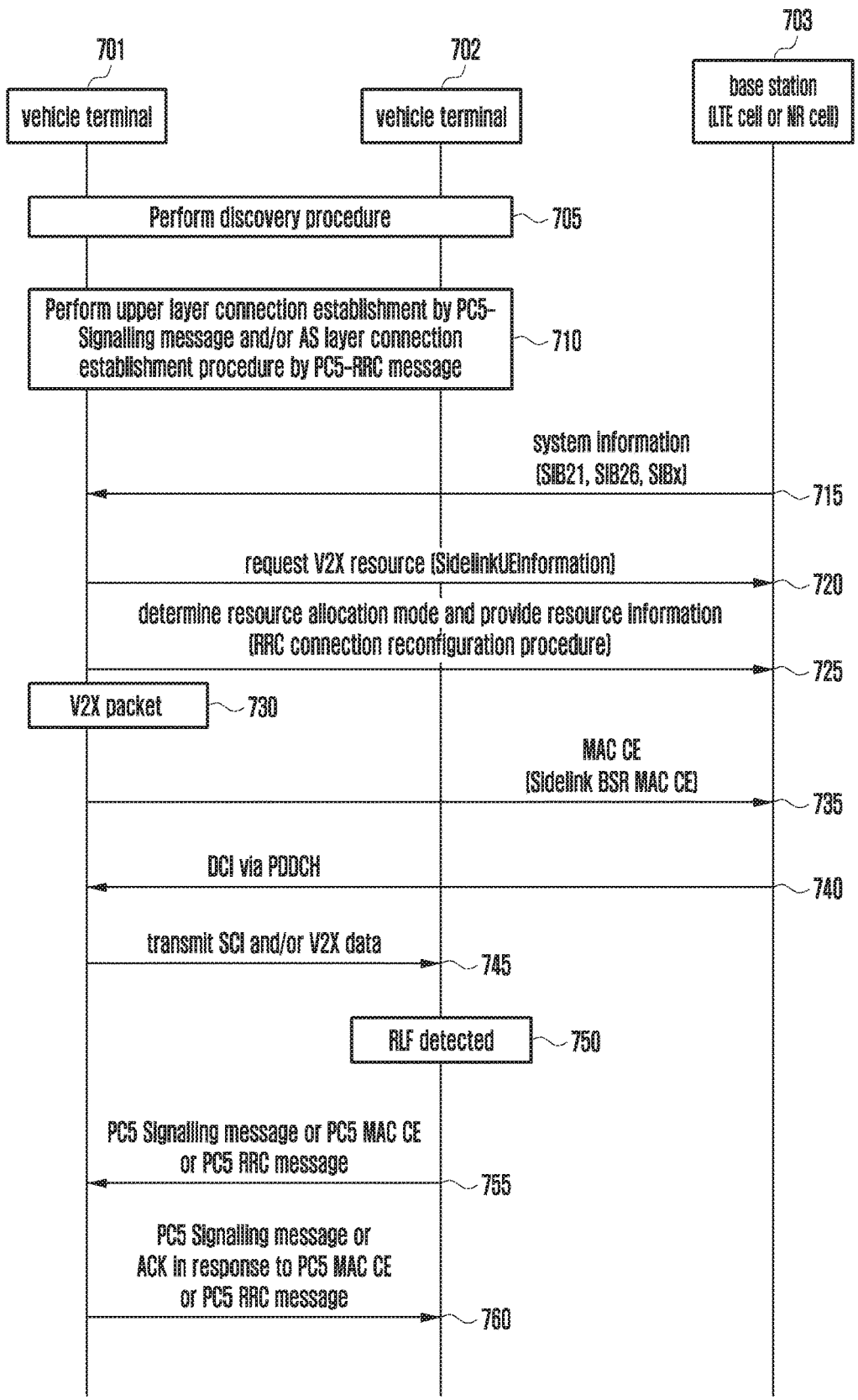
FIG. 7 illustrates radio link monitoring (RLM)-based sidelink management when NR V2X SL unicast communication between terminals is performed according to an embodiment of the disclosure.

FIG. 7 illustrates radio link monitoring (RLM)-based sidelink management when NR V2X SL unicast communication between terminals is performed according to an embodiment of the disclosure.

Referring to FIG. 7, for NR V2X SL unicast communication, a vehicle terminal 701 may perform a discovery procedure with a different vehicle terminal 702 in operation 705. In addition, the vehicle terminal 701 may perform an upper-layer connection establishment procedure and/or an AS-layer connection establishment procedure in order to establish a UE-UE sidelink connection with the different vehicle terminal 702 in operation 710. The UE-UE sidelink connection may be established according to the foregoing embodiment.

In operation 715, the vehicle terminal 701 may receive system information from a base station. The system information (e.g., SIB21 and/or SIB26 and/or SIBx to be newly defined in NR) may include V2X sidelink configuration information. Operation 715 may be performed before operation 710 or 705.

In operation 720, the vehicle terminal 701 may configure an RRC connection mode with the base station 703 and may transmit a SidelinkUEInformation message to the base station 703 in operation 720 to request a V2X transmission resource (pool) and/or a V2X reception resource (pool). The SidelinkUEInformation message includes an indicator or IE indicating whether the vehicle terminal 701 performs V2X SL communication with the different vehicle terminal 702 by broadcast and/or performs V2X SL communication by unicast and/or performs V2X communication by groupcast. Alternatively, the SidelinkUEInformation message may include QoS-related information (e.g., a ProSe per-packet priority (PPPP) and/or ProSe per-packet reliability (PPPR) list and/or a 5G QoS indicator (5QI) or V2X QoS indicator (VQI) list/set). The base station 703 may allocate different transmission and reception resource pools to the vehicle terminal 701 according to the SidelinkUEInformation message.

In operation 725, the base station 703 may perform an RRC connection reconfiguration procedure with the vehicle terminal 701 in response. More particularly, the RRC connection reconfiguration procedure may be performed by the base station 703 transmitting an RRC connection reconfiguration message (RRCConnectionReconfiguration or RRCReconfiguration) to the vehicle terminal 701 and by the vehicle terminal 701 transmitting an RRC connection reconfiguration completion message (RRCConnectionReconfigurationComplete or RRCReconfigurationComplete) to the base station 703. Through the RRC connection reconfiguration procedure, the vehicle terminal 701 may perform NR V2X SL unicast communication with the vehicle terminal 702 in a scheduled resource allocation mode (mode 1 and/or mode 3) or a UE autonomous resource selection mode (mode 2 and/or mode 4).

When the vehicle terminal 701 performs NR V2X SL unicast communication in the scheduled resource allocation mode, the RRC connection reconfiguration message transmitted from the base station 703 to the vehicle terminal 701 in operation 725 may include at least one of the following parameters including SL-V2X-ConfigDedicated as an IE.

Indicator indicating scheduled resource allocation mode

Radio network temporary identifier (RNTI) used for V2X SL communication. For example, the RNTI may be an RNTI (e.g., an SL-V-RNTI) used by the base station 703 to dynamically schedule a resource for the vehicle terminal 701 with downlink control information (DCI) transmitted through a PDCCH.

MAC main configuration information used for V2X SL communication (mac-MainConfig for V2X SL). For example, the vehicle terminal 701 may receive a separate timer related to a buffer status report (hereinafter, "BSR") from a base station for V2X SL unicast communication with the different vehicle terminal 702. A periodic timer (periodic-BSR-TimerSL for V2X) and/or a retransmission timer (retex-BSR-TimerSL for V2X) may be set.

Transmission resource pool and/or transmission resource pool addition/modification list and/or transmission resource pool release list for which the base station schedules a transmission resource for a vehicle terminal for V2X SL communication. For example, the transmission resource pool may be configured in common regardless of the transmission type of the vehicle terminal 701 (e.g., broadcast and/or groupcast and/or unicast). The transmission resource pool may be configured separately for V2X SL unicast communication of the vehicle terminal 701 with the different vehicle terminal 702 (or according to the transmission type). The transmission resource pool may be configured to be divided into a pool used in a normal operation and a pool used in an exceptional situation (e.g., a resource pool used during an HO or a resource pool used when an RLF occurs). The vehicle terminal 701 may exchange the transmission resource pool with the different vehicle terminal 702 through a PC5 RRC message.

Modulation and coding scheme (MCS) information. In one example, an integer value (INTEGER (0, . . . , Y)) indicating an MCS table supporting X QAM may be configured, where X and Y are variables, and a plurality of different Y values may be taken even for the same X (for supporting a URLLC service).

Logical channel group information list (logicalCh-GroupInfoList). For example, the list may include a PPPP and/or a PPPR value or list for each logical channel group (hereinafter, "LCG"). The list may also include a 5QI and/or VQI value or lists for each LCG. Depending on this information, the vehicle terminal 701 may have a different method for performing V2X SL unicast communication with the different vehicle terminal 702 (e.g., when performing a carrier reselection, performing an HARQ process, and allocating transmission and reception resource pools). One or a plurality of LCGs may be configured.

Synchronization and resource allocation configuration information at a neighboring carrier frequency other than the current serving carrier frequency of a terminal in V2X SL communication. For example, this information may include v2x-InterFreqInfoList as an IE. When the vehicle terminal 701 has a problem about V2X SL unicast communication with the different vehicle terminal 702, the vehicle terminal 701 may perform a handover to a cell in v2x-InterFreqInfoList or may reselect a cell in v2x-InterFreqInfoList according to this information, thereby performing V2X SL communication.

Priority information indicating whether to preferentially perform uplink transmission or to preferentially perform sidelink transmission. For example, this information may include information about whether the vehicle terminal 701 needs to perform uplink transmission to the base station 702, to perform sidelink transmission to the different vehicle terminal 702 via unicast, to perform sidelink transmission to neighboring vehicles via broadcast, or to perform sidelink transmission via groupcast.

Information indicating synchronization reference type. For example, this information may indicate and include one of a global navigation satellite system (GNSS), a base station, and a terminal.

CBR configuration information and relevant PSCCH TX configuration information list for V2X SL communication. For example, this information may include cbr-DedicatedTxConfigList as an IE.

Packet duplication-related information for V2X SL communication. For example, this information may include v2x-PacketDuplicationConfig as an IE.

Candidate synchronization carrier frequency list available for V2X SL communication.

Information about synchronization carrier frequency to be considered when a terminal transmits a sidelink synchronization signal in V2X SL communication. For example, this information may include slss-TxMultiFreq as an IE, which may indicate whether the terminal transmits a sidelink synchronization signal only at one synchronization carrier frequency or transmits the sidelink synchronization signal at a plurality of carrier frequencies.

At least one or a plurality of pieces of information among the information include in the PC5 RRC message illustrated in the foregoing embodiment may be included. For example, the RLF timer values and the relevant constant value configuration information may be included.

Operations 720 and 725 described above do not necessarily need to be performed after operation 710. For example, operations 720 and 725 may be performed before the discovery procedure is performed (operation 705), while the discovery procedure is performed (operation 705), after the discovery procedure is performed (operation 705) and before the V2X sidelink connection is established (operation 710), or while the V2X sidelink connection is established (operation 710). In this case, the information exchanged between the vehicle terminal 701 and the base station 703 in operations 720 and 725 may be used when the UE-UE V2X sidelink connection is established (operation 710). For example, the vehicle terminal 701 may provide information (e.g., transmission resource pool information or MCS information) included in an RRC connection resumption message received from the base station 703 in operation 725 to the different vehicle terminal 702 via a PC5 RRC message.

When the vehicle terminal 701 performs NR V2X SL unicast communication in the UE autonomous resource selection mode (mode 2 and/or mode 4), the RRC connection reconfiguration message transmitted from the base station 703 to the vehicle terminal 701 in operation 725 may include at least one of the following parameters including SL-V2X-ConfigDedicated as an IE.

Indicator or IE indicating UE autonomous resource selection. This indicator or IE may distinctively indicate or specify specific UE autonomous resource selection types.

Transmission resource pool and/or transmission resource pool addition/modification list and/or transmission resource pool release list available to a vehicle terminal for V2X SL communication. For example, the transmission resource pool may be configured in common regardless of the transmission type of the vehicle terminal 701 (e.g., broadcast and/or groupcast and/or unicast). The transmission resource pool may be configured separately for V2X SL unicast communication of the vehicle terminal 701 with the different vehicle terminal 702 (or according to the transmission type). The transmission resource pool may be configured for the vehicle terminal 701 to be divided into a pool used in a normal operation and a pool used in an exceptional situation (e.g., a resource pool used during an HO or a resource pool used when an RLF occurs). The vehicle terminal 701 may exchange the resource pool with the different vehicle terminal 702 through a PC5 RRC message.

Configuration information related to transmission resource pool detection in UE autonomous resource selection. For example, this information may include PSSCH transmission configuration information, PSCCH reference signal received power threshold information, a resource reservation period, probability information for determining maintenance of a currently used transmission resource, resource reselection-related configuration information (sl-ReselectAfter), or the like.

Modulation and coding scheme (MCS) information. In one example, an integer value (INTEGER (0, ..., Y)) indicating an MCS table supporting X QAM may be configured, where X and Y are variables, and a plurality of different Y values may be taken even for the same X (for supporting a URLLC service).

Logical channel group information list (logicalChGroupInfoList). For example, the list may include a PPPP and/or a PPPR value or list for each logical channel group (hereinafter, "LCG"). The list may also include a 5QI and/or VQI value or lists for each LCG. One or a plurality of LCGs may be configured.

Synchronization and resource allocation configuration information at a neighboring carrier frequency other than the current serving carrier frequency of a terminal in V2X SL communication. For example, this information may include v2x-InterFreqInfoList as an IE. When the vehicle terminal 701 has a problem about V2X SL unicast communication with the different vehicle terminal 702, the vehicle terminal 701 may perform a handover to a cell in v2x-InterFreqInfoList or may reselect a cell in v2x-InterFreqInfoList according to this information, thereby performing V2X SL communication.

Priority information indicating whether to preferentially perform uplink transmission or to preferentially perform sidelink transmission. For example, this information may include information about whether the vehicle terminal 701 needs to perform uplink transmission to the base station 702, to perform sidelink transmission to the different vehicle terminal 702 via unicast, to perform sidelink transmission to neighboring vehicles via broadcast, or to perform sidelink transmission via groupcast.

Information indicating synchronization reference type. For example, this information may indicate and include one of a global navigation satellite system (GNSS), a base station, and a terminal.

CBR configuration information and relevant PSCCH TX configuration information list for V2X SL communication. For example, this information may include cbr-DedicatedTxConfigList as an IE.

Packet duplication-related information for V2X SL communication. For example, this information may include v2x-PacketDuplicationConfig as an IE.

Candidate synchronization carrier frequency list available for V2X SL communication.

Information about synchronization carrier frequency to be considered when a terminal transmits a sidelink synchronization signal in V2X SL communication. For example, this information may include slss-TxMultiFreq as an IE, which may indicate whether the terminal transmits a sidelink synchronization signal only at one synchronization carrier frequency or transmits the sidelink synchronization signal at a plurality of carrier frequencies.

In operation 725, at least one piece or a plurality of pieces of the information included in the PC5 RRC message according to the foregoing embodiment may be included in the connection reconfiguration message (RRCReconfiguration message) and/or connection reconfiguration completion message (RRCReconfigurationComplete message).

In operation 730, a V2X packet to be transmitted by the vehicle terminal 701 to the different vehicle terminal 702 may be generated.

When the vehicle terminal 701 performs NR V2X SL unicast communication in the scheduled resource allocation mode, the vehicle terminal 701 may transmit a MAC CE to the base station 702 in operation 735. For example, the MAC CE may be a Sidelink BSR MAC CE and may include at least the following information.

Indicator/index or IE indicating a destination ID used for V2X SL unicast communication with the different vehicle terminal 702. For example, an ID for identifying the different vehicle terminal 702 in layer 2 may be included, or some information about a ProSe destination may be included.

Indicator or IE indicating that the V2X packet is to be transmitted via V2X SL unicast communication. For example, the indicator or IE may include information indicating that the V2X packet will be transmitted by unicast and/or groupcast and/or broadcast.

Information about a V2X service via which V2X SL unicast communication with the different vehicle terminal 702 is performed may be included.

An index for an LCG ID for reporting a buffer status may be included.

Buffered data size. For example, the size of data buffered for each LCG ID and/or for each V2X service may be included.

In operation 740, the base station may transmit DCI to the vehicle terminal 701 through a PDCCH. The vehicle terminal 701 may transmit a MAC CE to the base station 702. The vehicle terminal 701 may identify sidelink resource allocation information through blind decoding.

When the vehicle terminal 701 performs NR V2X SL unicast communication in the UE autonomous resource selection mode, after the V2X packet is generated in operation 730, operations 735 and 740 may not be performed.

In operation 745, the vehicle terminal 701 may transmit sidelink control information (hereinafter, "SCI") and/or data to the different vehicle terminal 702. The SCI may be transmitted through a physical sidelink control channel (PSCCH), and the actual data may be transmitted through a physical sidelink shared channel (PSSCH).

In operation 745, the vehicle terminal 701 may perform retransmission with the different vehicle terminal 702 through an HARQ process. For example, the vehicle terminal 701 may perform retransmission by operating a new timer for the HARQ process when transmitting the SCI and/or the data.

In operation 750, the different vehicle terminal 702 may identify/detect a radio link failure (RLF) in a sidelink with the vehicle terminal 701 for some reason. For example, referring to the foregoing embodiment, when the different vehicle terminal 702 fails to decode a PSCCH transmitted from the vehicle terminal 701 and accordingly an operated timer (timer C in the foregoing embodiment) expires, thus detecting a physical-layer problem, an RLF may be identified. When the RLF is detected, the vehicle terminal 702 may perform at least one of the following operations.

The terminal may release the UE-UE V2X sidelink connection without a separate procedure. Here, the terminal may release all DRBs and SRBs related to a unicast link (or destination) in which the RLF is detected and may release SL UE context related to the unicast link in which the RLF is detected.

An AS layer of the different vehicle terminal 702 may indicate to an NAS layer that the RLF has been identified (e.g., by reporting the identifier of a PC5 link in which the RLF has been detected), and/or may include a reason for a link problem in the AS layer, and/or may include a reason for generating a PC5 signaling message. The NAS layer may generate a PC5 signaling message.

The vehicle terminal 702 may transmit a PC5 MAC CE message to the vehicle terminal 701, thus indicating that the RLF has been identified, indicating the release of the UE-UE V2X sidelink connection, or indicating the transmission of a V2X message through a separate transmission resource pool.

The vehicle terminal 702 may transmit a PC5 RRC message to the vehicle terminal 701, thus indicating that the RLF has been identified or including specific details about the RLF including the cause of the RLF (rlf-Cause), and/or indicating the release of the UE-UE V2X sidelink connection, and/or requesting a change in a transmission resource pool and/or a reception resource pool used for the UE-UE V2X sidelink.

The different vehicle terminal 702 may operate a timer (timer F in the foregoing embodiment), based on the foregoing embodiment. When the timer expires, the terminal may release the UE-UE V2X sidelink connection.

When the maximum number of retransmissions is reached in a sidelink RLC entity with respect to a particular unicast link (or a particular destination) in operation 745, the vehicle terminal 701 may also detect the RLF in operation 750. When the RLF is detected, the vehicle terminal 701 may perform the same operations as described above.

In operation 755, the different vehicle terminal 702 may transmit a PC5 signaling message and/or a PC5 MAC CE message and/or a PC5 RRC message to the vehicle terminal 701. Here, the different vehicle terminal 702 may transmit the PC5 signaling message and/or the PC5 MAC CE message and/or the PC5 RRC message using a separate transmission pool used when a problem occurs in the UE-UE sidelink (e.g., when an RLF occurs) or a different common transmission resource pool not used in operation 745.

For example, the transmission resource pool may be an exceptional transmission resource pool designated between the terminals in operation 710 or operation 725, may be a (exceptional) transmission resource pool among preconfigured resource pools, or may be a different common transmission resource pool not used. A timer (timer F in the foregoing embodiment) operated in operation 750 may be stopped when the PC5 signaling message and/or the PC5 MAC CE message and/or the PC5 RRC message is transmitted (755) or when a PC5 signaling message and/or a PC5 MAC CE message and/or a PC5 RRC message is received (760) in response thereto.

In operation 755, the different vehicle terminal 702 may transmit a DIRECT_COMMUNICATION_RELEASE message, which is the PC5 signaling message, to the vehicle terminal 701, thereby performing a direct link release procedure. The DIRECT_COMMUNICATION_RELEASE message may include a reason for releasing the UE-UE sidelink (e.g., a cause value indicating that the sidelink cannot be maintained any longer due to the RLF). When transmitting the DIRECT_COMMUNICATION_RELEASE message, the different vehicle terminal 702 may operate a timer. The DIRECT_COMMUNICATION_RELEASE message may be retransmitted at least once or more.

When transmitting the DIRECT_COMMUNICATION_RELEASE message and/or when receiving a DIRECT_COMMUNICATION_RELEASE ACCEPT message in operation 760 and/or when the timer operated when transmitting the DIRECT_COMMUNICATION_RELEASE message expires, the different vehicle terminal 702 may release the UE-UE sidelink.

In operation 760, the vehicle terminal 701 may transmit a DIRECT_COMMUNICATION_RELEASE_ACK message, which is a PC5 signaling message, to the different vehicle terminal 702. The vehicle terminal 701 may not transmit the DIRECT_COMMUNICATION_RELEASE_ACK message according to the cause value included in the received DIRECT_COMMUNICATION_RELEASE message. The vehicle terminal 701 may release the sidelink with the different vehicle terminal 702 when transmitting the DIRECT_COMMUNICATION_RELEASE_ACK message. Alternatively, when determining that the DIRECT_COMMUNICATION_RELEASE_ACK message does not need to be transmitted, the vehicle terminal 701 may immediately release the sidelink with the different vehicle terminal 702. In operation 760, the vehicle terminal 701 may use a separate transmission resource pool as in operation 755 or may use a transmission resource pool previously used.

In operation 755, the different vehicle terminal 702 may transmit a DIRECT_COMMUNICATION_KEEPALIVE message, which is a PC5 signaling message, to the vehicle terminal 701, thereby performing a direct link keepalive procedure. The DIRECT_COMMUNICATION_KEEPALIVE message may include a reason for maintaining the UE-UE sidelink. When transmitting the DIRECT_COMMUNICATION_KEEPALIVE message, the different vehicle terminal 702 may operate a timer. The DIRECT_COMMUNICATION_KEEPALIVE message may be retransmitted at least once or more. When not receiving a DIRECT_COMMUNICATION_KEEPALIVE_ACK message in operation 760 and/or when the timer operated when transmitting the DIRECT_COMMUNICATION_KEEPALIVE message expires, the different vehicle terminal 702 may release the UE-UE sidelink. When receiving a DIRECT_COMMUNICATION_KEEPALIVE_ACK message in operation 760, the different vehicle terminal 702 may maintain the V2X NR sidelink.

In operation 760, the vehicle terminal 701 may transmit a DIRECT_COMMUNICATION_KEEPALIVE_ACK message, which is a PC5 signaling message, to the different vehicle terminal 702. When transmitting the DIRECT_COMMUNICATION_KEEPALIVE_ACK message, the vehicle terminal 701 may maintain the sidelink with the different vehicle terminal 702. Alternatively, when determining that the DIRECT_COMMUNICATION_KEEPALIVE_ACK message does not need to be transmitted, the vehicle terminal 701 may immediately release the sidelink with the different vehicle terminal 702. In operation 760, the vehicle terminal 701 may use a separate transmission resource pool as in operation 755 or may use a transmission resource pool previously used.

In operation 755, the different vehicle terminal 702 may transmit a PC5 MAC CE message to the vehicle terminal 701. Here, the different vehicle terminal 702 may transmit the PC5 MAC CE message using a separate transmission pool used when a problem occurs in the UE-UE sidelink (e.g., when an RLF occurs) or a different common transmission resource pool not used in operation 745. For example, the transmission resource pool may be an exceptional transmission resource pool designated between the terminals in operation 710 or operation 725, may be a (exceptional) transmission resource pool among preconfigured resource pools, or may be a different common transmission resource pool not used. The timer (timer F in the foregoing embodiment) operated in operation 750 may be stopped when the PC5 MAC CE message is transmitted (755) or when a positive acknowledgment of the PC5 MAC CE message (e.g., an ACK of the PC5 MAC CE) is received (760).

In operation 755, the different vehicle terminal 702 may transmit a PC5 MAC CE message to the vehicle terminal 701. The PC5 MAC CE message may indicate the release of the UE-UE V2X sidelink connection. The PC5 MAC CE message may indicate the transmission of a V2X message through a separate transmission resource pool and/or reception resource pool to maintain the UE-UE V2X sidelink connection. The PC5 MAC CE message may indicate the maintenance of the UE-UE V2X sidelink connection. The PC5 MAC CE message may indicate that there is a problem in the UE-UE V2X sidelink connection.

In operation 760, the vehicle terminal 701 may transmit a positive acknowledgment (ACK) or a negative acknowledgment (NACK) of the PC5 MAC CE message to the different vehicle terminal 702. The ACK of the PC5 MAC CE message may be interpreted differently depending on the content of the PC5 MAC CE message transmitted in operation 755. For example, an ACK of a UE-UE V2X sidelink connection release indication may mean the release of the UE-UE V2X sidelink connection, and an ACK of a UE-UE V2X sidelink connection maintenance indication may mean the maintenance of the UE-UE V2X sidelink connection.

In operation 755, the different vehicle terminal 702 may transmit a PC5 RRC message to the vehicle terminal 701. The PC5 RRC message may include a reason for releasing the UE-UE sidelink (e.g., a cause value indicating that the sidelink cannot be maintained any longer due to the RLF) or a reason for maintaining the UE-UE sidelink. The PC5 RRC message may indicate the release or maintenance of the UE-UE V2X sidelink connection. The PC5 RRC message may include a request to change a transmission resource pool and/or reception resource pool used for the UE-UE V2X sidelink or information about a transmission resource pool and/or reception resource pool to be changed. The PC5 RRC message may include at least one piece of the information included in the foregoing embodiment in operation 710. When transmitting the PC5 RRC message, the different vehicle terminal 702 may operate a timer. The PC5 RRC message may be retransmitted at least once or more. When transmitting the PC5 RRC message and/or when receiving a PC5 RRC message in operation 760 and/or when the timer operated when transmitting the PC5 RRC message expires, the different vehicle terminal 702 may release the UE-UE sidelink.

In operation 760, the vehicle terminal 701 may transmit a PC5 RRC message to the different vehicle terminal 702 in response to operation 755. The vehicle terminal 701 may not transmit the PC5 RRC message according to information included in the received PC5 RRC message. When transmitting the PC5 RRC message, the vehicle terminal 701 may release the sidelink with the different vehicle terminal 702.

The vehicle terminal 701 may include information about a transmission resource pool and/or reception resource pool changed/newly used for the V2X sidelink in order to maintain the V2X sidelink connection with the different vehicle terminal 702. The PC5 RRC message may include at least one piece of the information included in the foregoing embodiment in operation 710. Alternatively, when determining that the PC5 RRC message does not need to be transmitted, the vehicle terminal 701 may immediately release the sidelink with the different vehicle terminal 702. In operation 760, the vehicle terminal 701 may use a separate transmission resource pool as in operation 755 or may use a transmission resource pool previously used.

In operation 750 or after operation 750, the vehicle terminal 701 or 702 transmit an RRC message including the cause of the RLF (rlf-Cause) to a serving cell and/or a special cell (sPCell), thereby reporting the RLF occurring in operation 750. For example, the RRC message may be SidelinkUEInformation, UEAssistanceInformation, UEInformationResponse, or the like. The vehicle terminal may report the RFL to the base station upon receiving a request for a report of the RLF directly from the base station, or the vehicle terminal may periodically report the RLF to the base station. For example, the vehicle terminal 701 or 702 may report the detected/declared RLF to the serving cell and/or the special cell using a SidelinkUEInformation message through a series of procedures illustrated below.

When the most recently transmitted SidelinkUEInformation message includes sl-RxInterestedFreqList, the vehicle terminal may transmit the SidelinkUEInformation message to the base station in order to indicate that there is no more interest in sidelink communication reception via the unicast link in which the RFL is detected/declared. Here, the terminal may not include a reception frequency or a reception frequency list for the unicast link in which the RLF is detected/declared in the SidelinkUEInformation message and may include an explicit failure indication due to the RLF as a reason therefor, thereby transmitting the SidelinkUEInformation message to the base station. Alternatively, the terminal may include a reception frequency or a reception frequency list for the unicast link in which the RLF is detected/declared in the SidelinkUEInformation message and may include an explicit failure indication due to the RLF as a reason therefor, thereby transmitting the SidelinkUEInformation message to the base station.

When the most recently transmitted SidelinkUEInformation message includes sl-TxResourceReqList, the vehicle terminal may transmit the SidelinkUEInformation message to the base station in order to indicate that there is no more interest in sidelink communication transmission via the unicast link in which the RFL is detected/declared. Here, the terminal may transmit the message including an explicit failure indication due to the RLF with respect to the unicast link in which the RFL is detected/declared. Further, the terminal may include or may not include a destination identity with respect to the unicast link in which the RLF occurs and may include a unicast link corresponding to the destination identity. Further, the terminal may not include a transmission frequency or a transmission frequency list for the unicast link in which the RLF is detected/declared in the SidelinkUEInformation message. In addition, the terminal may not include a QoS information list or a synchronization configuration list for the unicast link in which the RLF is detected/declared in the SidelinkUEInformation message.

For example, the SidelinkUEInformation message may have an ASN.1 structure having the following information.
—SidelinkUEInformationNR The SidelinkUEinformationNRmessage is used for the indication of NR sidelink UE information to the network.
Signaling radio bearer: SRB1
RLC-SAP: AM
Logical channel: DCCH
Direction: UE to Network

| SidelinkUEInformationNR message |
|---|
| ```
-- ASN1START
-- TAG-SIDELINKUEINFORMATIONNR-START
SidelinkUEInformationNR-r16: : =       SEQUENCE {
    criticalExtensions                 CHOICE {
        sidelinkUEInformationNR-r16        SidelinkUEInformationNR-r16-IEs,
        criticalExtensionsFuture           SEQUENCE { }
    }
}
SidelinkUEInformationNR-r16-IEs:: =    SEQUENCE {
    sl-RxInterestedFreqList-r16            SL-InterestedFreqList-r16               OPTIONAL,
    sl-TxResourceReqList-r16               SL-TxResourceReqList-r16OPTIONAL,
    lateNonCriticalExtension               OCTET STRING                            OPTIONAL,
    sl-failurecause    ENUMERATE {RLF}
    nonCriticalExtension                   SEQUENCE { }                            OPTIONAL
}
SL-TxResourceReqList-r16 ::=                   SEQUENCE (SIZE (1..maxNrofSL-Dest-r16)) OF SL-TxResourceReq-r16
SL-TxResourceReq-r16::=                SEQUENCE {
    sl-DestinationIdentity-r16             SL-DestinationIdentity-r16,
    sl-CastType-r16      ENUMERATED {broadcast, groupcast, unicast, spare1},
    sl-QoS-InfoList-r16                    SEQUENCE (SIZE (1..maxNrofSL-QFIsPerDest-r16)) OF SL-QoS-Info-r16,
    sl-TypeTxSyr.cList-r16                         SEQUENCE (SIZE (1..maxNrofFreqSL-r16)) OF SL-TypeTxSync-r16,
    sl-TxInterestedFreqList-r16            SEQUENCE (SIZE (1..maxNrofFreqSL-r16) ) OF INTEGER (1..max NrofFreqSL-r16)
    sl-failurecause    ENUMERATE {RLF}
}
-- Editor's Notes: The use and structure of sl-TypeTxSyncList and sl-TxInterestedFreqList are
``` |

| SidelinkUEInformationNR message |
| --- |

```
FFS.
SL-QoS-Info-r16 ::=             SEQUENCE {
    sl-QoS-FlowIdentity-r16     ,
    sl-QoS- Profile-r16         SL-QoS-Profile-r16
}
-- TAG-SIDELINKUEINFORMATIONNR-STOP
-- ASN1STOP
```

The base station may allocate a transmission/reception resource pool or a dedicated transmission resource to the terminal supporting the V2X SL using the information. The base station may change V2X SL configuration information (V2X configuration information included in an SIB and/or RRC message) to the terminal supporting the V2X SL using the information. For example, the base station may allocate a resource, which is allocated to the terminals 701 and 702, to a different terminal, based on the SidelinkUEInformation message.

The vehicle terminal 701 and the different vehicle terminal 702 may perform NR V2X SL unicast communication through a relay in operation 750 or after operation 750. For example, in operation 755, the different vehicle terminal 702 may transmit an indicator or IE indicating the maintenance of the NR V2X SL unicast communication to the vehicle terminal 701 through the relay. Alternatively, in operation 760, the vehicle terminal 701 may transmit an indicator or IE indicating the maintenance of the NR V2X SL unicast communication to the different vehicle terminal 702 through the relay.

Figure 8:
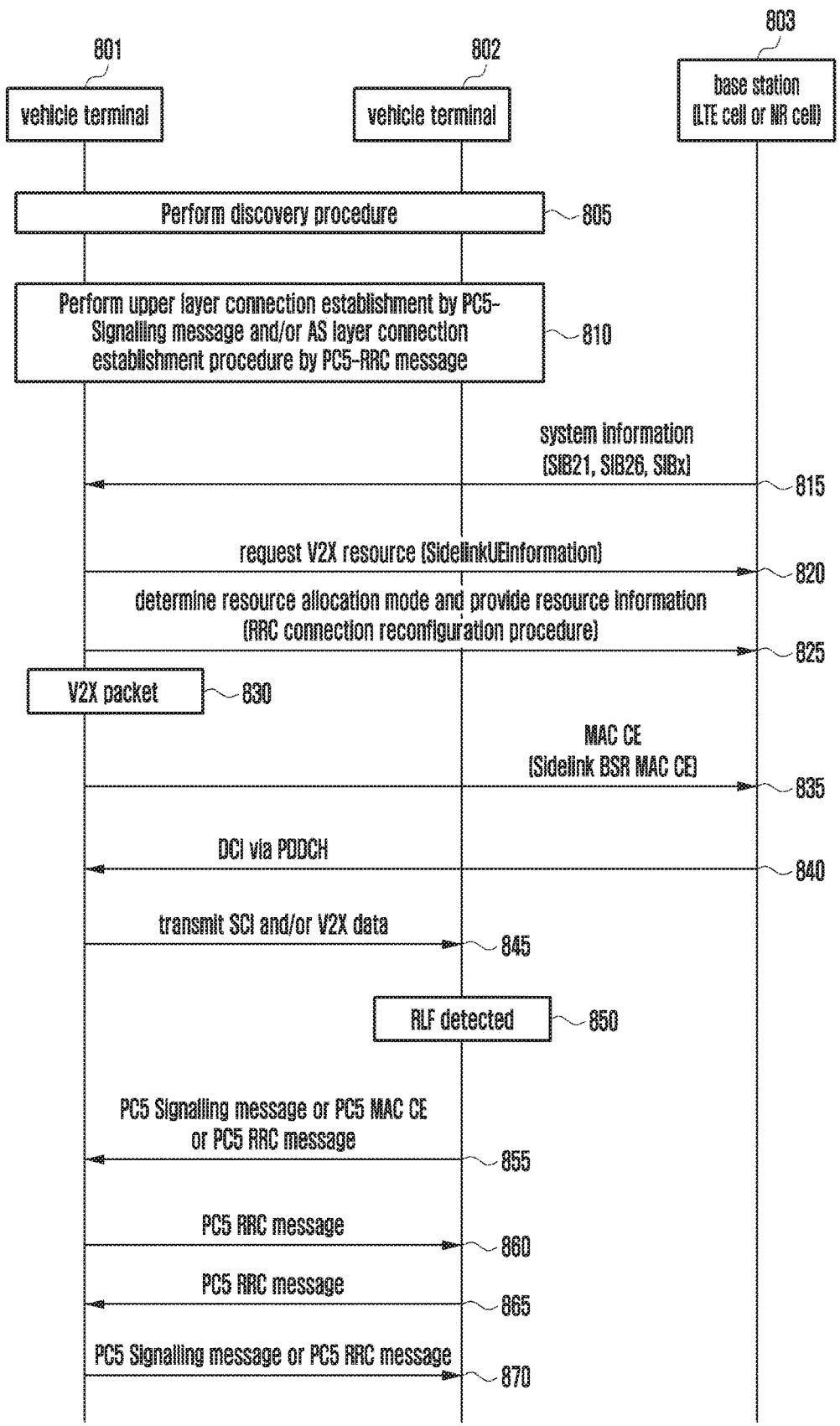
FIG. 8 illustrates RLM-based sidelink management when NR V2X SL unicast communication between terminals is performed according to an embodiment of the disclosure.

FIG. 8 illustrates radio link monitoring (RLM)-based sidelink management when NR V2X SL unicast communication between terminals is performed according to an embodiment of the disclosure.

Referring to FIG. 8, for NR V2X SL unicast communication, a vehicle terminal 801 may perform a discovery procedure with a different vehicle terminal 802 in operation 805. In addition, the vehicle terminal 801 may perform an upper-layer connection establishment procedure and/or an AS-layer connection establishment procedure in order to establish a UE-UE sidelink connection with the different vehicle terminal 802 in operation 810. The UE-UE sidelink connection may be established according to the foregoing embodiment.

In operation 815, the vehicle terminal 801 may receive system information from a base station. The system information (e.g., SIB21 and/or SIB26 and/or SIBx to be newly defined in NR) may include V2X sidelink configuration information. Operation 815 may be performed before operation 810 or 805.

In operation 820, the vehicle terminal 801 may configure an RRC connection mode with the base station 803 and may transmit a SidelinkUEInformation message to the base station 803 (820) to request a V2X transmission resource (pool) and/or a V2X reception resource (pool). The SidelinkUE-Information message includes an indicator or IE indicating whether the vehicle terminal 801 performs V2X SL communication with the different vehicle terminal 802 by broadcast and/or performs V2X SL communication by unicast and/or performs V2X communication by groupcast. Alternatively, the SidelinkUEInformation message may include QoS-related information (e.g., a ProSe per-packet priority (PPPP) and/or ProSe per-packet reliability (PPPR) list and/or a 5G QoS indicator (5QI) or V2X QoS indicator (VQI) list/set). The base station 803 may allocate different transmission resource pools or reception resource pools to the vehicle terminal 801 according to the SidelinkUEInformation message.

In operation 825, the base station 803 may perform an RRC connection reconfiguration procedure with the vehicle terminal 801 in response. More particularly, the RRC connection reconfiguration procedure may be performed by the base station 803 transmitting an RRC connection reconfiguration message (RRCConnectionReconfiguration or RRCReconfiguration) to the vehicle terminal 801 and by the vehicle terminal 801 transmitting an RRC connection reconfiguration completion message (RRCConnectionReconfigurationComplete or RRCReconfigurationComplete) to the base station 803. Through the RRC connection reconfiguration procedure, the vehicle terminal 801 may perform NR V2X SL unicast communication with the vehicle terminal 802 in a scheduled resource allocation mode (mode 1 and/or mode 3) or a UE autonomous resource selection mode (mode 2 and/or mode 4).

When the vehicle terminal 801 performs NR V2X SL unicast communication in the scheduled resource allocation mode, the RRC connection reconfiguration message transmitted from the base station 803 to the vehicle terminal 801 in operation 825 may include at least one of the following parameters including SL-V2X-ConfigDedicated as an IE.

Indicator indicating scheduled resource allocation mode

Radio network temporary identifier (RNTI) used for V2X SL communication. For example, the RNTI may be an RNTI (e.g., an SL-V-RNTI) used by the base station 803 to dynamically schedule a resource for the vehicle terminal 801 with downlink control information (DCI) transmitted through a PDCCH.

MAC main configuration information used for V2X SL communication (mac-MainConfig for V2X SL). For example, the vehicle terminal 801 may receive a separate timer related to a buffer status report (hereinafter, "BSR") from a base station for V2X SL unicast communication with the different vehicle terminal 802. A periodic timer (periodic-BSR-TimerSL for V2X) and/or a retransmission timer (retex-BSR-TimerSL for V2X) may be set.

Transmission resource pool and/or transmission resource pool addition/modification list and/or transmission resource pool release list for which the base station schedules a transmission resource for a vehicle terminal for V2X SL communication. For example, the transmission resource pool may be configured in common regardless of the transmission type of the vehicle terminal 801 (e.g., broadcast and/or groupcast and/or unicast). The transmission resource pool may be configured separately for V2X SL unicast communication of the vehicle terminal 801 with the different vehicle terminal 802 (or according to the transmission type). The transmission resource pool may be configured to be divided into a pool used in a normal operation and a pool used in an exceptional situation (e.g., a resource pool used during an HO or a resource pool used when an RLF occurs). The vehicle terminal 801 may exchange the transmission resource pool with the different vehicle terminal 802 through a PC5 RRC message.

Modulation and coding scheme (MCS) information. In one example, an integer value (INTEGER (0, . . . , Y)) indicating an MCS table supporting X QAM may be configured, where X and Y are variables, and a plurality of different Y values may be taken even for the same X (for supporting a URLLC service).

Logical channel group information list (logicalCh-GroupInfoList). For example, the list may include a PPPP and/or a PPPR value or list for each logical channel group (hereinafter, "LCG"). The list may also include a 5QI and/or VQI value or lists for each LCG. Depending on this information, the vehicle terminal 801 may have a different method for performing V2X SL unicast communication with the different vehicle terminal 802 (e.g., when performing a carrier reselection, performing an HARQ process, and allocating transmission and reception resource pools). One or a plurality of LCGs may be configured.

Synchronization and resource allocation configuration information at a neighboring carrier frequency other than the current serving carrier frequency of a terminal in V2X SL communication. For example, this information may include v2x-InterFreqInfoList as an IE. When the vehicle terminal 801 has a problem about V2X SL unicast communication with the different vehicle terminal 802, the vehicle terminal 701 may perform a handover to a cell in v2x-InterFreqInfoList or may reselect a cell in v2x-InterFreqInfoList according to this information, thereby performing V2X SL communication.

Priority information indicating whether to preferentially perform uplink transmission or to preferentially perform sidelink transmission. For example, this information may include information about whether the vehicle terminal 801 needs to perform uplink transmission to the base station 803, to perform sidelink transmission to the different vehicle terminal 802 via unicast, to perform sidelink transmission to neighboring vehicles via broadcast, or to perform sidelink transmission via groupcast.

Information indicating synchronization reference type. For example, this information may indicate and include one of a global navigation satellite system (GNSS), a base station, and a terminal.

CBR configuration information and relevant PSCCH TX configuration information list for V2X SL communication. For example, this information may include cbr-DedicatedTxConfigList as an IE.

Packet duplication-related information for V2X SL communication. For example, this information may include v2x-PacketDuplicationConfig as an IE.

Candidate synchronization carrier frequency list available for V2X SL communication.

Information about synchronization carrier frequency to be considered when a terminal transmits a sidelink synchronization signal in V2X SL communication. For example, this information may include slss-TxMultiFreq as an IE, which may indicate whether the terminal transmits a sidelink synchronization signal only at one synchronization carrier frequency or transmits the sidelink synchronization signal at a plurality of carrier frequencies.

At least one or a plurality of pieces of information among the information include in the PC5 RRC message illustrated in the foregoing embodiment may be included. For example, the RLF timer values and the relevant constant value configuration information may be included.

Operations 820 and 825 described above do not necessarily need to be performed after operation 810. For example, operations 820 and 825 may be performed before the discovery procedure is performed in operation 805, while the discovery procedure is performed in operation 805, after the discovery procedure is performed in operation 805 and before the V2X sidelink connection is established in operation 810, or while the V2X sidelink connection is established (operation 810). In this case, the information exchanged between the vehicle terminal 801 and the base station 803 in operations 820 and 825 may be used when the UE-UE V2X sidelink connection is established in operation 810. For example, the vehicle terminal 801 may provide information (e.g., transmission resource pool information or MCS information) included in an RRC connection resumption message received from the base station 803 in operation 825 to the different vehicle terminal 802 via a PC5 RRC message.

When the vehicle terminal 801 performs NR V2X SL unicast communication in the UE autonomous resource selection mode (mode 2 and/or mode 4), the RRC connection reconfiguration message transmitted from the base station 803 to the vehicle terminal 801 in operation 825 may include at least one of the following parameters including SL-V2X-ConfigDedicated as an IE.

Indicator or IE indicating UE autonomous resource selection. This indicator or IE may distinctively indicate or specify specific UE autonomous resource selection types.

Transmission resource pool and/or transmission resource pool addition/modification list and/or transmission resource pool release list available to a vehicle terminal for V2X SL communication. For example, the transmission resource pool may be configured in common regardless of the transmission type of the vehicle terminal 801 (e.g., broadcast and/or groupcast and/or unicast). The transmission resource pool may be configured separately for V2X SL unicast communication of the vehicle terminal 801 with the different vehicle terminal 802 (or according to the transmission type). The transmission resource pool may be configured for the vehicle terminal 801 to be divided into a pool used in a normal operation and a pool used in an exceptional situation (e.g., a resource pool used during an HO or a resource pool used when an RLF occurs). The vehicle terminal 801 may exchange the resource pool with the different vehicle terminal 802 through a PC5 RRC message.

Configuration information related to transmission resource pool detection in UE autonomous resource selection. For example, this information may include PSSCH transmission configuration information, PSCCH reference signal received power threshold information, a resource reservation period, probability information for determining maintenance of a currently used transmission resource, resource reselection-related configuration information (sl-ReselectAfter), or the like.

Modulation and coding scheme (MCS) information. In one example, an integer value (INTEGER (0, ..., Y)) indicating an MCS table supporting X QAM may be configured, where X and Y are variables, and a plurality of different Y values may be taken even for the same X (for supporting a URLLC service).

Logical channel group information list (logicalCh-GroupInfoList). For example, the list may include a PPPP and/or a PPPR value or list for each logical channel group (hereinafter, "LCG"). The list may also include a 5QI and/or VQI value or lists for each LCG. One or a plurality of LCGs may be configured.

Synchronization and resource allocation configuration information at a neighboring carrier frequency other than the current serving carrier frequency of a terminal in V2X SL communication. For example, this information may include v2x-InterFreqInfoList as an IE. When the vehicle terminal 801 has a problem about V2X SL unicast communication with the different vehicle terminal 802, the vehicle terminal 801 may perform a handover to a cell in v2x-InterFreqInfoList or may reselect a cell in v2x-InterFreqInfoList according to this information, thereby performing V2X SL communication.

Priority information indicating whether to preferentially perform uplink transmission or to preferentially perform sidelink transmission. For example, this information may include information about whether the vehicle terminal 801 needs to perform uplink transmission to the base station 803, to perform sidelink transmission to the different vehicle terminal 802 via unicast, to perform sidelink transmission to neighboring vehicles via broadcast, or to perform sidelink transmission via groupcast.

Information indicating synchronization reference type. For example, this information may indicate and include one of a global navigation satellite system (GNSS), a base station, and a terminal.

CBR configuration information and relevant PSCCH TX configuration information list for V2X SL communication. For example, this information may include cbr-DedicatedTxConfigList as an IE.

Packet duplication-related information for V2X SL communication. For example, this information may include v2x-PacketDuplicationConfig as an IE.

Candidate synchronization carrier frequency list available for V2X SL communication.

Information about synchronization carrier frequency to be considered when a terminal transmits a sidelink synchronization signal in V2X SL communication. For example, this information may include slss-TxMultiFreq as an IE, which may indicate whether the terminal transmits a sidelink synchronization signal only at one synchronization carrier frequency or transmits the sidelink synchronization signal at a plurality of carrier frequencies.

In operation 825, at least one piece or a plurality of pieces of the information included in the PC5 RRC message according to the foregoing embodiment may be included in the connection reconfiguration message (RRCReconfiguration message) and/or connection reconfiguration completion message (RRCReconfigurationComplete message).

In operation 830, a V2X packet to be transmitted by the vehicle terminal 801 to the different vehicle terminal 802 may be generated.

When the vehicle terminal 801 performs NR V2X SL unicast communication in the scheduled resource allocation mode, the vehicle terminal 801 may transmit a MAC CE to the base station 803 in operation 835. For example, the MAC CE may be a Sidelink BSR MAC CE and may include at least the following information.

Indicator/index or IE indicating a destination ID used for V2X SL unicast communication with the different vehicle terminal 802. For example, an ID for identifying the different vehicle terminal 802 in layer 2 may be included, or some information about a ProSe destination may be included.

Indicator or IE indicating that the V2X packet is to be transmitted via V2X SL unicast communication. For example, the indicator or IE may include information indicating that the V2X packet will be transmitted by unicast and/or groupcast and/or broadcast.

Information about a V2X service via which V2X SL unicast communication with the different vehicle terminal 802 is performed may be included.

An index for an LCG ID for reporting a buffer status may be included.

Buffered data size. For example, the size of data buffered for each LCG ID and/or for each V2X service may be included.

In operation 840, the base station may transmit DCI to the vehicle terminal 801 through a PDCCH. The vehicle terminal 801 may transmit a MAC CE to the base station 803. The vehicle terminal 801 may identify sidelink resource allocation information through blind decoding.

When the vehicle terminal 801 performs NR V2X SL unicast communication in the UE autonomous resource selection mode, after the V2X packet is generated in operation 830, operations 835 and 840 may not be performed.

In operation 845, the vehicle terminal 801 may transmit sidelink control information (hereinafter, "SCI") and/or data to the different vehicle terminal 802. The SCI may be transmitted through a physical sidelink control channel (PSCCH), and the actual data may be transmitted through a physical sidelink shared channel (PSSCH). In operation 845, the vehicle terminal 801 may perform retransmission with the different vehicle terminal 802 through an HARQ process. For example, the vehicle terminal 801 may perform retransmission by operating a new timer for the HARQ process when transmitting the SCI and/or the data.

In operation 850, the different vehicle terminal 802 may identify/detect a radio link failure (RLF) in a sidelink with the vehicle terminal 801 for some reason. For example, referring to the foregoing embodiment, when the different vehicle terminal 802 fails to decode a PSCCH transmitted from the vehicle terminal 801 and accordingly an operated timer (timer C in the foregoing embodiment) expires, thus detecting a physical-layer problem, an RLF may be identified. When the RLF is detected, the vehicle terminal 802 may perform at least one of the following operations.

An AS layer of the different vehicle terminal 802 may indicate to an NAS layer that the RLF has been identified (e.g., by reporting the identifier of a PC5 link in which the RLF has been detected), and/or may include a reason for a link problem in the AS layer, and/or may include a reason for generating a PC5 signaling message. The NAS layer may generate a PC5 signaling message.

The vehicle terminal 802 may transmit a PC5 MAC CE message to the vehicle terminal 801, thus indicating that the RLF has been identified and/or indicating the transmission of a V2X message through a separate transmission resource pool.

The vehicle terminal 802 may transmit a PC5 RRC message to the vehicle terminal 801, thus indicating that the RLF has been identified or including specific details about the RLF including the cause of the RLF (rlf-Cause), and/or indicating the maintenance of the UE-UE V2X sidelink connection, and/or requesting a change in a transmission resource pool and/or a reception resource pool used for the UE-UE V2X sidelink.

The different vehicle terminal 802 may operate a timer (timer F in the foregoing embodiment), based on the foregoing embodiment. When the timer expires, the terminal may release the UE-UE V2X sidelink connection.

In operation 855, the different vehicle terminal 802 may transmit a PC5 signaling message and/or a PC5 MAC CE message and/or a PC5 RRC message to the vehicle terminal 801. Here, the different vehicle terminal 802 may transmit the PC5 signaling message and/or the PC5 MAC CE message and/or the PC5 RRC message using a separate transmission pool used when a problem occurs in the UE-UE sidelink (e.g., when an RLF occurs) or a different common transmission resource pool not used in operation 845.

For example, the transmission resource pool may be an exceptional transmission resource pool designated between the terminals in operation 810 or operation 825, may be a (exceptional) transmission resource pool among preconfigured resource pools, or may be a different common transmission resource pool not used. A timer (timer F in the foregoing embodiment) operated in operation 850 may be stopped when the PC5 signaling message and/or the PC5 MAC CE message and/or the PC5 RRC message is transmitted in operation 855 or when a PC5 signaling message and/or a PC5 MAC CE message and/or a PC5 RRC message is received in operation 860 in response thereto.

In operation 855, the different vehicle terminal 702 may transmit a DIRECT_COMMUNICATION_KEEPALIVE message, which is a PC5 signaling message, to the vehicle terminal 801, thereby performing a direct link keepalive procedure. The DIRECT_COMMUNICATION_KEEPALIVE message may include a reason for maintaining the UE-UE sidelink. When transmitting the DIRECT_COMMUNICATION_KEEPALIVE message, the different vehicle terminal 802 may operate a timer. The DIRECT_COMMUNICATION_KEEPALIVE message may be retransmitted at least once or more.

When receiving a DIRECT_COMMUNICATION_KEEPALIVE_ACK message in operation 870, the different vehicle terminal 802 may maintain the UE-UE unicast NR V2X SL to perform communication. When the timer operated when transmitting the DIRECT_COMMUNICATION_KEEPALIVE message expires, the different vehicle terminal 802 may release the NR V2X sidelink with the vehicle terminal 801 or may perform a direct link release procedure.

In operation 860, the vehicle terminal 801 may transmit a PC5 RRC message to the different vehicle terminal 802. The vehicle terminal 801 may indicate the maintenance of the unicast V2X SL connection with the vehicle terminal 802 through the PC5 RRC message. The PC5 RRC message may include a request to change a transmission resource pool and/or reception resource pool or information about a transmission resource pool and/or reception resource pool changed/newly used. The PC5 RRC message may include at least one piece of the information included in the foregoing embodiment in operation 810.

In operation 865, the different vehicle terminal 802 may transmit a PC5 RRC message to the vehicle terminal 801 in response to operation 860. When transmitting the PC5 RRC message, the different vehicle terminal 802 may release the sidelink with the vehicle terminal 801 or may indicate the release of the sidelink. The different vehicle terminal 802 may include information about a transmission resource pool and/or reception resource pool changed/newly used for the V2X sidelink in order to maintain the V2X sidelink connection with the vehicle terminal 801. The different vehicle terminal 802 may transmit a PC5 RRC message as information and an acknowledgement indicating that the PC5 RRC message transmitted from the vehicle terminal 801 has been successfully received. The PC5 RRC message may include at least one piece of the information included in the foregoing embodiment in operation 810. In operation 865, the different vehicle terminal 802 may transmit the PC5 RRC message to the vehicle terminal 801 using a separate transmission resource pool as in operation 855 or 860, using a previously used transmission resource pool, or using a separate transmission resource pool to be used in operation 855 or 860.

In operation 870, the vehicle terminal 801 may transmit a DIRECT_COMMUNICATION_KEEPALIVE_ACK message, which is a PC5 signaling message, to the different vehicle terminal 802. When transmitting the DIRECT_COMMUNICATION_KEEPALIVE_ACK message, the vehicle terminal 801 may maintain the sidelink with the different vehicle terminal 802. In operation 870, the vehicle terminal 801 may transmit the PC5 signaling message to the different vehicle terminal 802 using a separate transmission resource pool as in operation 855, 860 or 865, using a previously used transmission resource pool, or using a separate transmission resource pool to be used in operation 855, 860, or 865.

In operation 855, the different vehicle terminal 802 may transmit a PC5 MAC CE message to the vehicle terminal 801. Here, the different vehicle terminal 802 may transmit the PC5 MAC CE message using a separate transmission pool used when a problem occurs in the UE-UE sidelink (e.g., when an RLF occurs) or a different common transmission resource pool not used in operation 845. For example, the transmission resource pool may be an exceptional transmission resource pool designated between the terminals in operation 810 or operation 825, may be a (exceptional) transmission resource pool among preconfigured resource pools, or may be a different common transmission resource pool not used. The timer (timer F in the foregoing embodiment) operated in operation 850 may be stopped when the PC5 MAC CE message is transmitted (855) or when a PC5 RRC message is received as a response to the transmitted PC5 MAC CE message (860).

In operation 855, the different vehicle terminal 802 may transmit a PC5 MAC CE message to the vehicle terminal 801. The PC5 MAC CE message may indicate the transmission of a V2X message through a separate transmission resource pool and/or reception resource pool to maintain the UE-UE V2X sidelink connection. The PC5 MAC CE message may indicate the maintenance of the UE-UE V2X sidelink connection. The PC5 MAC CE message may indicate that there is a problem in the UE-UE V2X sidelink connection.

In operation 860, the vehicle terminal 801 may transmit a PC5 RRC message to the different vehicle terminal 802. The vehicle terminal 801 may indicate the maintenance of the unicast V2X SL connection with the vehicle terminal 802 through the PC5 RRC message. The PC5 RRC message may include a request to change a transmission resource pool and/or reception resource pool or information about a transmission resource pool and/or reception resource pool changed/newly used. The PC5 RRC message may include at least one piece of the information included in the foregoing embodiment in operation 810.

In operation 865, the different vehicle terminal 802 may transmit a PC5 RRC message to the vehicle terminal 801 in response to operation 860. When transmitting the PC5 RRC message, the different vehicle terminal 802 may release the sidelink with the vehicle terminal 801 or may indicate the release of the sidelink. The different vehicle terminal 802 may include information about a transmission resource pool and/or reception resource pool changed/newly used for the V2X sidelink in order to maintain the V2X sidelink connection with the vehicle terminal 801. The different vehicle terminal 802 may transmit, through the PC5 RRC message, information and/or an acknowledgement indicating that the PC5 RRC message transmitted from the vehicle terminal 801 has been successfully received and/or information indicating that the UE-UE NR V2X sidelink connection can be maintained. The PC5 RRC message may include at least one piece of the information included in the foregoing embodiment in operation 810. In operation 865, the different vehicle terminal 802 may transmit the PC5 RRC message to the vehicle terminal 801 using a separate transmission resource pool as in operation 855 or 860, using a previously used transmission resource pool, or using a separate transmission resource pool to be used in operation 855 or 860.

In operation 870, the vehicle terminal 801 may transmit a PC5 RRC message to the different vehicle terminal 802. The vehicle terminal 801 may transmit, through the PC5 RRC message, information and/or an acknowledgement indicating that the PC5 RRC message transmitted from the different vehicle terminal 802 has been successfully received and/or information indicating that the UE-UE NR V2X sidelink connection can be maintained. In operation 870, the vehicle terminal 801 may transmit the PC5 RRC message to the different vehicle terminal 802 using a separate transmission resource pool as in operation 855, 860 or 865, using a previously used transmission resource pool, or using a separate transmission resource pool to be used in operation 855, 860, or 865.

In operation 855, the different vehicle terminal 802 may transmit a PC5 RRC message to the vehicle terminal 801. Here, the different vehicle terminal 802 may transmit the PC5 RRC message using a separate transmission pool used when a problem occurs in the UE-UE sidelink (e.g., when an RLF occurs) or a different common transmission resource pool not used in operation 845. For example, the transmission resource pool may be an exceptional transmission resource pool designated between the terminals in operation 810 or operation 825, may be a (exceptional) transmission resource pool among preconfigured resource pools, or may be a different common transmission resource pool not used. The timer (timer F in the foregoing embodiment) operated in operation 850 may be stopped when the PC5 RRC message is transmitted (855) or when a PC5 RRC message is received as a response to the transmitted PC5 RRC message (860).

In operation 855, the different vehicle terminal 802 may transmit a PC5 RRC message to the vehicle terminal 801. The PC5 RRC message may indicate the transmission of a V2X message through a separate transmission resource pool and/or reception resource pool to maintain the UE-UE V2X sidelink connection. The PC5 RRC message may indicate the maintenance of the UE-UE V2X sidelink connection. The PC5 RRC message may indicate that there is a problem in the UE-UE V2X sidelink connection. The PC5 RRC message may include a request to change a transmission resource pool and/or reception resource pool or information about a transmission resource pool and/or reception resource pool changed/newly used. The PC5 RRC message may include at least one piece of the information included in the foregoing embodiment in operation 810.

In operation 860, the vehicle terminal 801 may transmit a PC5 RRC message to the different vehicle terminal 802. The vehicle terminal 801 may indicate the maintenance of the unicast V2X SL connection with the vehicle terminal 802 through the PC5 RRC message. The PC5 RRC message may include a request to change a transmission resource pool and/or reception resource pool or information about a transmission resource pool and/or reception resource pool changed/newly used. The PC5 RRC message may include at least one piece of the information included in the foregoing embodiment in operation 810. The different vehicle terminal 802 may transmit, through a PC5 RRC message, information and/or an acknowledgement indicating that the PC5 RRC message transmitted from the vehicle terminal 801 has been successfully received and/or information indicating that the UE-UE NR V2X sidelink connection can be maintained.

In operation 865, the different vehicle terminal 802 may transmit a PC5 RRC message to the vehicle terminal 801 in response to operation 860. When transmitting the PC5 RRC message, the different vehicle terminal 802 may release the sidelink with the vehicle terminal 801 or may indicate the release of the sidelink. The different vehicle terminal 802 may include information about a transmission resource pool and/or reception resource pool changed/newly used for the V2X sidelink in order to maintain the V2X sidelink connection with the vehicle terminal 801. The different vehicle terminal 802 may transmit, through the PC5 RRC message, information and/or an acknowledgement indicating that the PC5 RRC message transmitted from the vehicle terminal 801 has been successfully received and/or information indicating that the UE-UE NR V2X sidelink connection can be maintained. The PC5 RRC message may include at least one piece of the information included in the foregoing embodiment in operation 810. In operation 865, the different vehicle terminal 802 may transmit the PC5 RRC message to the vehicle terminal 801 using a separate transmission resource pool as in operation 855 or 860, using a previously used transmission resource pool, or using a separate transmission resource pool to be used in operation 855 or 860.

In operation 850 or after operation 850, the vehicle terminal 801 or 802 transmit an RRC message including the cause of the RLF (rlf-Cause) to a serving cell and/or a special cell (sPCell), thereby reporting the RLF occurring in operation 850. For example, the RRC message may be SidelinkUEInformation, UEAssistanceInformation, UEInformationResponse, or the like. The vehicle terminal may report the RFL to the base station upon receiving a request for a report of the RLF directly from the base station, or the vehicle terminal may periodically report the RLF to the base station. The base station may allocate a transmission/reception resource pool or a dedicated transmission resource to the terminal supporting the V2X SL using the information. The base station may change V2X SL configuration information (V2X configuration information included in an SIB and/or RRC message) to the terminal supporting the V2X SL using the information.

The vehicle terminal 801 and the different vehicle terminal 802 may perform NR V2X SL unicast communication through a relay in operation 850 or after operation 850. For example, in operation 855, the different vehicle terminal 802 may transmit an indicator or IE indicating the maintenance of the NR V2X SL unicast communication to the vehicle terminal 801 through the relay. Alternatively, in operation 860, the vehicle terminal 801 may transmit an indicator or IE indicating the maintenance of the NR V2X SL unicast communication to the different vehicle terminal 802 through the relay.

Figure 9:
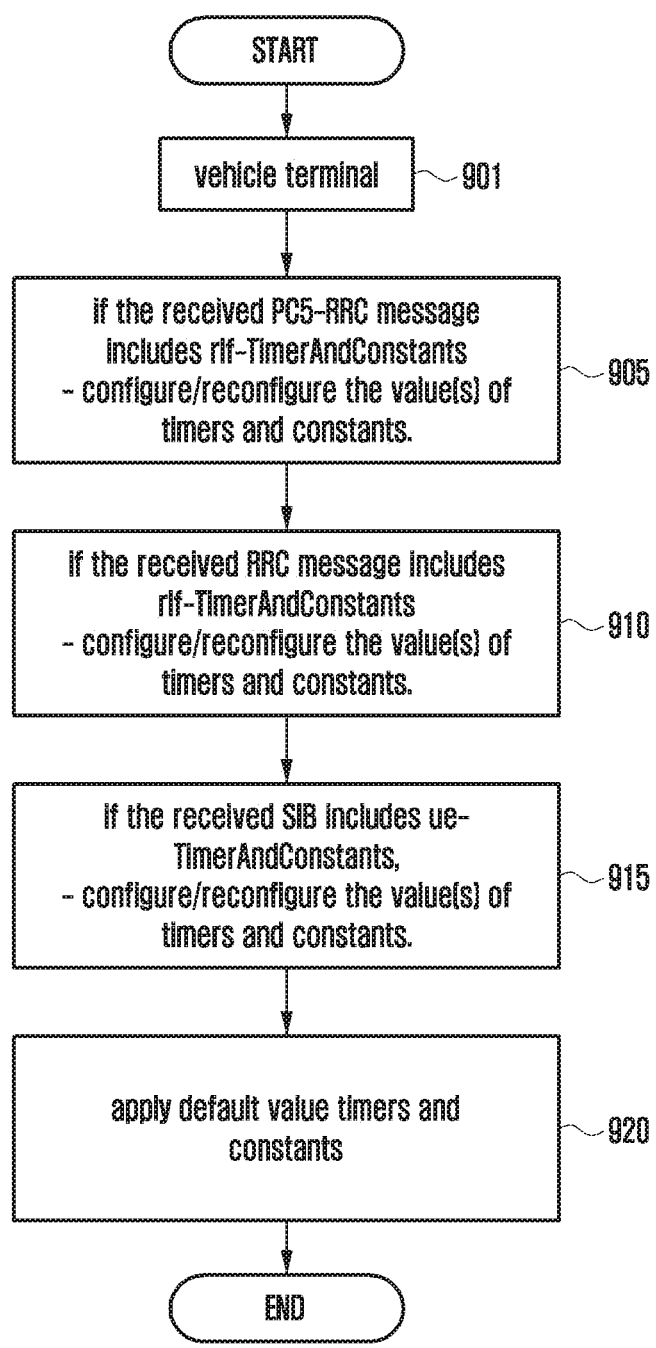
FIG. 9 illustrates a procedure for applying an RLM timer and relevant constant value configuration information when NR V2X SL unicast communication between terminals is performed according to an embodiment of the disclosure.

FIG. 9 illustrates a procedure for applying an RLM timer and relevant constant value configuration information when NR V2X SL unicast communication between terminals is performed according to an embodiment of the disclosure.

Referring to FIG. 9, when a received PC5 RRC message includes the values of an RLF timer and a relevant constant, a vehicle terminal 901 may configure or reconfigure the values. The values of the RLF timer and the relevant constant may include at least one piece of the information included in the foregoing embodiment (information related to A, B, C, D, E, and F in the foregoing embodiment).

When the condition in operation 905 is not satisfied in operation 910 and a dedicated RRC message received from a base station when (re)establishing an RRC connection with the base station includes the values of an RLF timer and a relevant constant, the vehicle terminal 901 may configure or reconfigure the values. The values of the RLF timer and the relevant constant may include at least one piece of the information included in the foregoing embodiment (information related to A, B, C, D, E, and F in the foregoing embodiment).

When the condition in the above operation is not satisfied in operation 915 and system information broadcast by the base station includes the values of an RLF timer and a relevant constant (included in ue-TimerAndConstants), the vehicle terminal 901 may configure or reconfigure the values. The values of the RLF timer and the relevant constant may include at least one piece of the information included in the foregoing embodiment (information related to A, B, C, D, E, and F in the foregoing embodiment).

When all of the above conditions are not satisfied, the vehicle terminal 901 may apply the default values of an RLF timer and a relevant constant in operation 920. The default values of the RLF timer and the relevant constant may include at least one piece of the information included in the foregoing embodiment (information related to A, B, C, D, E, and F in the foregoing embodiment).

Figure 10:
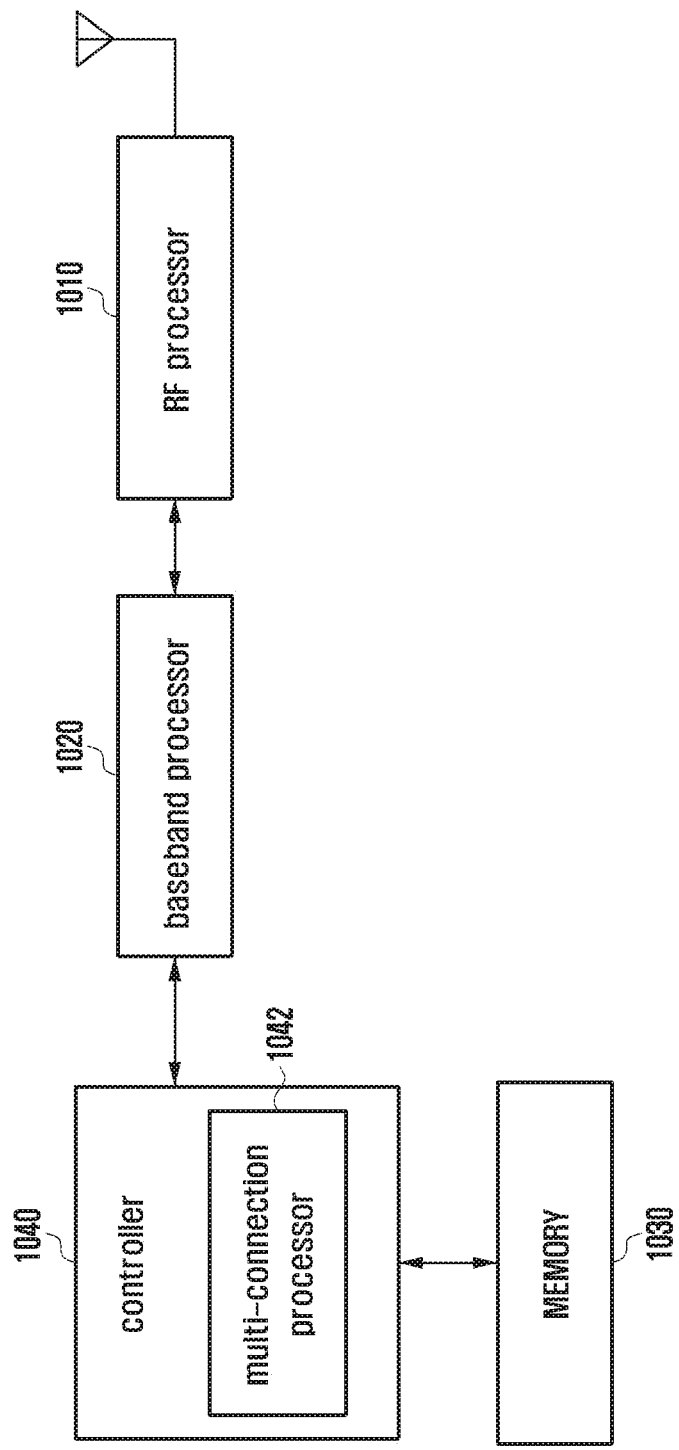
FIG. 10 illustrates a configuration of a UE according to an embodiment of the disclosure.

FIG. 10 illustrates a configuration of a UE according to an embodiment of the disclosure.

Referring to FIG. 10, the UE may include a radio frequency (RF) processor 1010, a baseband processor 1020, a memory 1030, and a controller 1040.

The RF processor 1010 according to an embodiment may perform a function for transmitting or receiving a signal through a wireless channel, such as band conversion and amplification of a signal. For example, the RF processor 1010 may upconvert a baseband signal, provided from the baseband processor 1020, into an RF band signal to transmit the RF band signal through an antenna and may downconvert an RF band signal, received through the antenna, into a baseband signal. For example, the RF processor 1010 may include a transmission filter, a reception filter, an amplifier, a mixer, an oscillator, a digital-to-analog converter (DAC), and an analog-to-digital converter (ADC).

Although FIG. 10 shows only one antenna, the UE may include a plurality of antennas.

In addition, the RF processor 1010 may include a plurality of RF chains. Further, the RF processor 1010 may perform beamforming. For beamforming, the RF processor 1010 may adjust the phase and strength of each of signals transmitted and received through a plurality of antennas or antenna elements. The RF processor 1010 may perform multiple-input and multiple-output (MIMO) and may receive a plurality of layers when performing MIMO. The RF processor 1010 may perform reception beam sweeping by appropriately setting the plurality of antennas or antenna elements under the control of the controller 1040, or may adjust the orientation and width of a reception beam such that the reception beam is coordinated with a transmission beam.

The baseband processor 1020 may perform a function of converting a baseband signal and a bit stream according to the physical-layer specification of a system. For example, in data transmission, the baseband processor 1020 may encode and modulate a transmission bit stream, thereby generating complex symbols. In data reception, the baseband processor 1020 may demodulate and decode a baseband signal, provided from the RF processor 1010, thereby reconstructing a reception bit stream. For example, according to OFDM, in data transmission, the baseband processor 1020 may generate complex symbols by encoding and modulating a transmission bit stream, may map the complex symbols to subcarriers, and may construct OFDM symbols through an inverse fast Fourier transform (IFFT) and cyclic prefix (CP) insertion. In data reception, the baseband processor 1020 may divide a baseband signal, provided from the RF processor 1010, into OFDM symbols, may reconstruct signals mapped to subcarriers through a fast Fourier transform (FFT), and may reconstruct a reception bit stream through demodulation and decoding.

As described above, the baseband processor 1020 and the RF processor 1010 may transmit and receive signals. Accordingly, the baseband processor 1020 and the RF processor 1010 may be referred to as a transmitter, a receiver, a transceiver, or a communication unit. At least one of the baseband processor 1020 and the RF processor 1010 may include a plurality of communication modules to support a plurality of different radio access technologies. Further, at least one of the baseband processor 1020 and the RF processor 1010 may include different communication modules for processing signals in different frequency bands. For example, the different radio access technologies may include an LTE network, an NR network, and the like. In addition, the different frequency bands may include a super high frequency (SHF) band (e.g., 2.2 GHz or 2 GHz) and a millimeter wave band (e.g., 60 GHz).

The memory 1030 may store data, such as a default program, an application, and configuration information for operating the UE. The memory 1030 may provide stored data upon request from the controller 1040.

The controller 1040 may include a multi-connection processor 1042 and may control overall operations of the UE. For example, the controller 1040 may transmit and receive signals through the baseband processor 1020 and the RF processor 1010. Further, the controller 1040 may record and read data in the memory 1030. To this end, the controller 1040 may include at least one processor. For example, the controller 1040 may include a communication processor (CP) to perform control for communication and an application processor (AP) to control an upper layer, such as an application.

Figure 11:
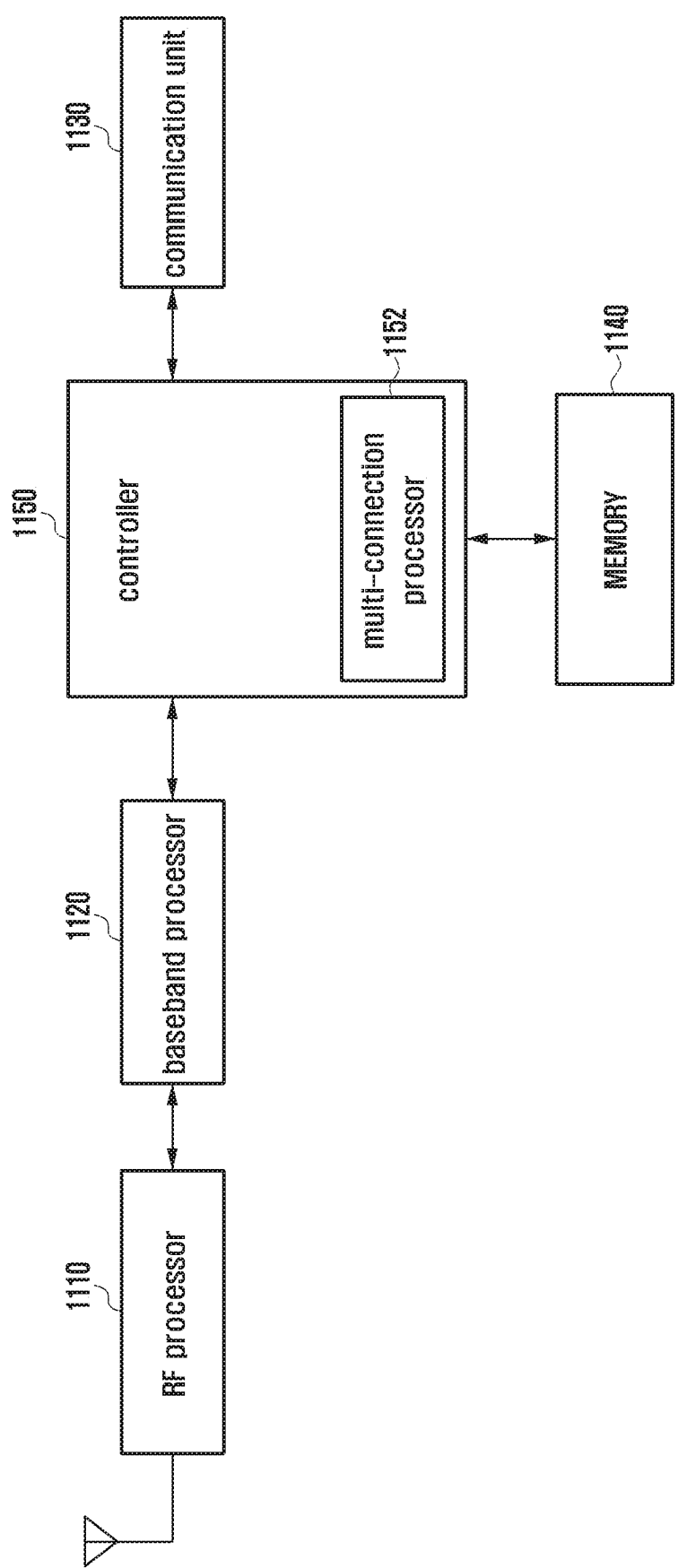
FIG. 11 illustrates a configuration of a base station according to an embodiment of the disclosure.

FIG. 11 illustrates a configuration of a base station according to an embodiment of the disclosure.

Referring to FIG. 11, the base station according to the embodiment may include one or more transmission and reception points (TRPs).

The base station according to the embodiment may include an RF processor 1110, a baseband processor 1120, a communication unit 1130, a memory 1140, and a controller 1150.

The RF processor 1110 may perform a function for transmitting or receiving a signal through a wireless channel, such as band conversion and amplification of a signal. For example, the RF processor 1110 may upconvert a baseband signal, provided from the baseband processor 1120, into an RF band signal to transmit the RF band signal through an antenna and may downconvert an RF band signal, received through the antenna, into a baseband signal. For example, the RF processor 1110 may include a transmission filter, a reception filter, an amplifier, a mixer, an oscillator, a DAC, and an ADC.

Although FIG. 11 shows only one antenna, the base station may include a plurality of antennas.

In addition, the RF processor 1110 may include a plurality of RF chains. Further, the RF processor 1110 may perform beamforming. For beamforming, the RF processor 1110 may adjust the phase and strength of each of signals transmitted and received through a plurality of antennas or antenna elements. The RF processor 110 may transmit one or more layers, thereby performing downlink MIMO.

The baseband processor 1120 may perform a function of converting a baseband signal and a bit stream according to the physical-layer specification of a first radio access technology. For example, in data transmission, the baseband processor 1120 may encode and modulate a transmission bit stream, thereby generating complex symbols. In data reception, the baseband processor 1120 may demodulate and decode a baseband signal, provided from the RF processor 1110, thereby reconstructing a reception bit stream. For example, according to OFDM, in data transmission, the baseband processor 1120 may generate complex symbols by encoding and modulating a transmission bit stream, may map the complex symbols to subcarriers, and may construct OFDM symbols through an IFFT and CP insertion. In data reception, the baseband processor 1120 may divide a baseband signal, provided from the RF processor 1110, into OFDM symbols, may reconstruct signals mapped to subcarriers through an FFT, and may reconstruct a reception bit stream through demodulation and decoding. As described above, the baseband processor 1120 and the RF processor 1110 may transmit and receive signals.

Accordingly, the baseband processor 1120 and the RF processor 1110 may be referred to as a transmitter, a receiver, a transceiver, a communication unit, or a wireless communication unit.

The communication unit 1130 may provide an interface for performing communication with other nodes in a network. For, example, the communication unit 1130 includes a backhaul communication unit. For example, the communication unit 1130 may convert a bit stream, transmitted from a main base station to another node, for example, a secondary base station or a core network, into a physical signal and may convert a physical signal, received from the other node, into a bit stream.

The memory 1140 may store data, such as a default program, an application, and configuration information for operating the main base station. In particular, the memory 1140 may store information on a bearer allocated to a connected UE, a measurement result reported from a connected UE, and the like. In addition, the memory 1140 may store information as a criterion for determining whether to provide or stop a multi-connection to a UE. The memory 1140 may provide stored data upon request from the controller 1150.

The controller 1150 may include a multi-connection processor 1152 and may control overall operations of the main base station. For example, the controller 1150 may transmit and receive signals through the baseband processor 1120 and the RF processor 1110 or through the communication unit 1130. Further, the controller 1150 may record and read data in the memory 1140. To this end, the controller 1150 may include at least one processor.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first user equipment (UE) in a wireless communication system, the method comprising:
   performing a communication with a second UE via a sidelink;
   identifying whether a condition related to a radio link failure (RLF) for the sidelink is satisfied;
   determining that the RLF for the sidelink is detected, in case that the condition is satisfied;
   releasing a connection with the second UE based on the RLF for the sidelink being detected; and
   transmitting, to a base station, information on the RLF for the sidelink.

2. The method of claim 1, further comprising:
indicating, from an access stratum (AS) layer to an upper layer, the RLF for the sidelink being detected.

3. The method of claim 2, wherein the indicating of the RLF being detected comprises indicating a PC5 unicast link identifier to the upper layer.

4. The method of claim 1, wherein the releasing of the connection with the second UE comprises releasing at least one of a data radio bearer (DRB) for the sidelink, a signaling radio bearer (SRB) for the sidelink, and a PC5-RRC connection for the sidelink.

5. The method of claim 1, wherein the information on the RLF is transmitted by a sidelink UE information message.

6. The method of claim 1, further comprising:
receiving, from the base station, configuration information for performing the communication with the second UE; and
performing the communication with the second UE, based on the configuration information.

7. The method of claim 6,
wherein the configuration information comprises at least one of a timer or a retransmission period.

8. The method of claim 1, wherein the condition is satisfied, in case that a maximum retransmission number of data according to the communication with the second UE is identified to be reached by a radio link control (RLC) entity of the first UE.

9. The method of claim 1, further comprising:
receiving, from the base station, an RRC message including sidelink resource information,
wherein the RRC message includes at least one of an RRC connection reconfiguration message or an RRC resume message.

10. A first user equipment (UE) in a wireless communication system, the first UE comprising:
a transceiver; and
at least one processor configured to:
control the transceiver to perform a communication with a second UE via a sidelink,
identify whether a condition related to a radio link failure (RLF) for the sidelink is satisfied,
determine that the RLF for the sidelink is detected, in case that the condition is satisfied,
control the transceiver to release a connection with the second UE based on the RLF for the sidelink being detected, and
control the transceiver to transmit, to a base station, information on the RLF for the sidelink.

11. The first UE of claim 10, wherein the at least one processor is further configured to
control to indicate from an access stratum (AS) layer to an upper layer the RLF being detected.

12. The first UE of claim 11, wherein the at least one processor is further configured to control to indicate a PC5 unicast link identifier to the upper layer.

13. The first UE of claim 10, wherein the at least one processor is further configured to control the transceiver to release at least one of a data radio bearer (DRB) for the sidelink, a signaling radio bearer (SRB) for the sidelink, and a PC5-RRC connection for the sidelink.

14. The first UE of claim 13, wherein the information on the RLF is transmitted by a sidelink UE information message.

15. The first UE of claim 13, wherein the at least one processor is further configured to control the transceiver to:
receive, from the base station, configuration information for performing the communication with the second UE, and
perform the communication with the second UE, based on the configuration information.

16. The first UE of claim 15, wherein the configuration information comprises at least one of a timer or a retransmission period.

17. The first UE of claim 10, wherein the at least one processor is further configured to identify the condition to be satisfied, in case that a maximum retransmission number of data according to the communication with the second UE is identified to be reached by a radio link control (RLC) entity of the first UE.

18. The first UE of claim 10,
wherein the at least one processor is further configured to control the transceiver to receive, from the base station, an RRC message including sidelink resource information, and
wherein the RRC message includes at least one of an RRC connection reconfiguration message or an RRC resume message.

* * * * *